(12) United States Patent
Sudo et al.

(10) Patent No.: US 6,926,516 B1
(45) Date of Patent: Aug. 9, 2005

(54) COMBUSTION METHOD AND BURNER

(75) Inventors: Jun Sudo, Kanagawa (JP); Toshiaki Hasegawa, Kanagawa (JP)

(73) Assignee: Nippon Furnace Kogyo Kabushiki Kiasha, Kanagawa (JP)

( * ) Notice: Subject to any disclaimer, the term of this patent is extended or adjusted under 35 U.S.C. 154(b) by 32 days.

(21) Appl. No.: 10/049,492

(22) PCT Filed: Aug. 17, 2000

(86) PCT No.: PCT/JP00/05518

§ 371 (c)(1),
(2), (4) Date: Feb. 12, 2002

(87) PCT Pub. No.: WO01/13041

PCT Pub. Date: Feb. 22, 2001

(30) Foreign Application Priority Data

Aug. 17, 1999 (JP) .................................. 11-230901
Aug. 11, 2000 (JP) .............................. 2000-245386

(51) Int. Cl.[7] .......................... F23D 14/22; F23L 15/02
(52) U.S. Cl. ............................. 431/8; 431/11; 431/175; 431/215; 239/433
(58) Field of Search .............................. 431/8, 11, 215, 431/186, 189, 181, 354, 174, 175, 161; 239/429, 239/433, 568

(56) References Cited

U.S. PATENT DOCUMENTS

| | | | |
|---|---|---|---|
| 3,202,203 A | * | 8/1965 | Reed ........................... 431/161 |
| 4,453,913 A | * | 6/1984 | Gitman ........................... 431/8 |
| 4,610,626 A | * | 9/1986 | Kikutani et al. ............. 431/351 |
| 5,360,171 A | * | 11/1994 | Yap ........................... 239/553.5 |
| 5,441,403 A | * | 8/1995 | Tanaka et al. .............. 431/175 |
| 5,662,467 A | * | 9/1997 | Jones ......................... 431/354 |
| 5,725,367 A | * | 3/1998 | Joshi et al. ..................... 431/8 |
| 5,833,447 A | | 11/1998 | Bodelin et al. |

(Continued)

FOREIGN PATENT DOCUMENTS

EP          0754912          7/1996      ........... F23D 14/32

(Continued)

OTHER PUBLICATIONS

International Search Report.
European Search Report.

*Primary Examiner*—Josiah C. Cocks
(74) *Attorney, Agent, or Firm*—Notaro & Michalos PC

(57) ABSTRACT

The present invention relates to a combustion method and a burner for forming a flame temperature having a flat temperature distribution which is the same as that in a case of a long furnace length even if a furnace length is short, and performs complete combustion. Further, a regenerative burner technique can be applied even if a furnace length is short. Combustion air whose quantity is less than the theoretical air quantity or not less than the theoretical air quantity is injected into a furnace so as to form a jet flow cross section having a larger specific surface area than that in a case of supplying the same quantity of combustion air from a circular throat, and fuel is injected toward this air jet flow to cause the fuel to be rapidly mixed with the air jet flow with strong turbulences before losing the velocity energy of the fuel. More preferably, an air throat 13 has a flat rectangular opening 13a.

40 Claims, 12 Drawing Sheets

U.S. PATENT DOCUMENTS 6,036,476 A * 3/2000 Mitani et al. ................ 431/215
6,126,438 A * 10/2000 Joshi et al. ................. 431/161

FOREIGN PATENT DOCUMENTS

| | | | | |
|---|---|---|---|---|
| EP | 0844433 | 5/1998 | ............. | F23C 7/02 |
| GB | 1074826 | 7/1967 | | |
| JP | 50104430 | 8/1975 | ........... | F23D 13/36 |
| JP | 60-233401 A * | 11/1985 | | |
| JP | 6272851 | 9/1994 | ........... | F23L 15/02 |
| JP | 10219354 | 8/1998 | ............ | C21D 9/00 |
| JP | 11-22915 A * | 1/1999 | | |
| JP | 11182818 | 7/1999 | ........... | F23D 14/22 |
| JP | 161614 | 6/2000 | ........... | F23D 14/22 |

* cited by examiner relation between NOx density and La/de

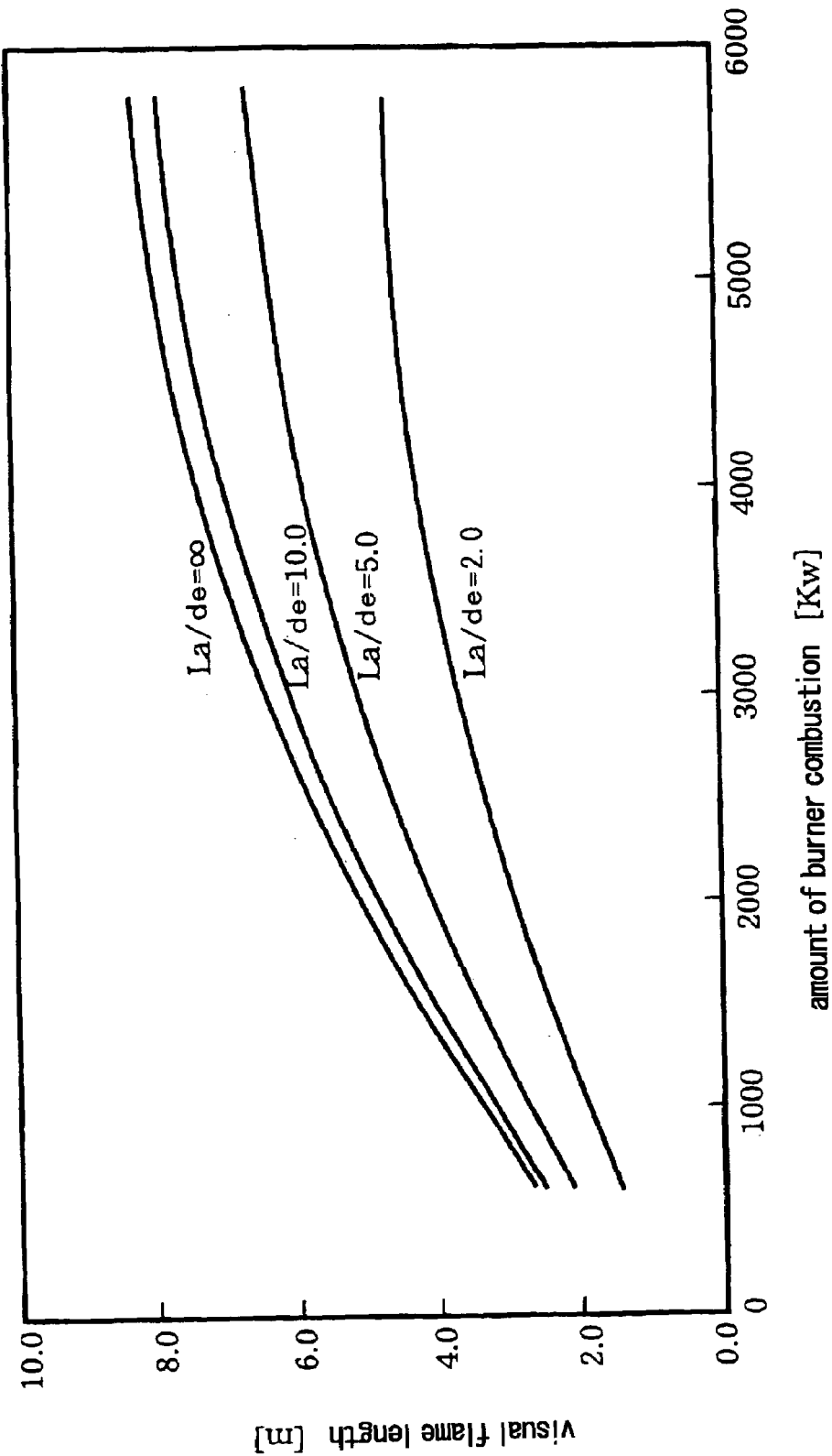
Fig. 11  relation between amount of burner combustion and visual flame length Fig. 13A
Fig. 13B
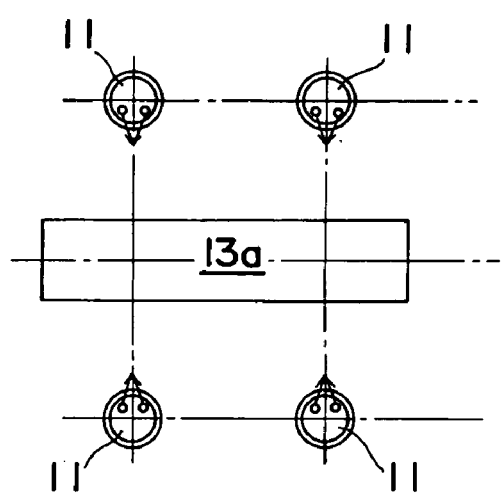
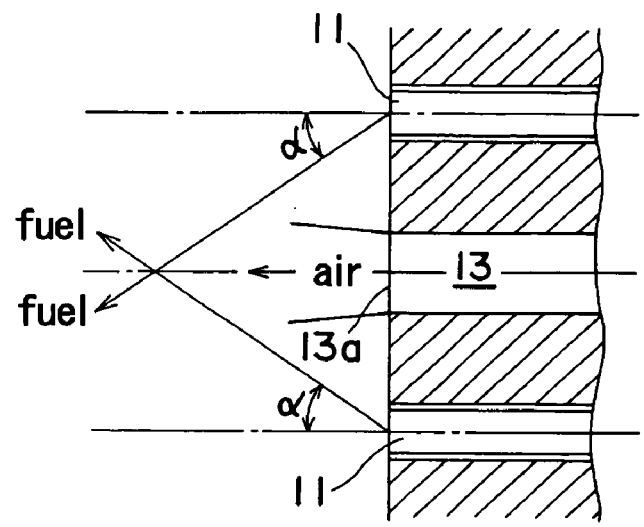
Fig. 14
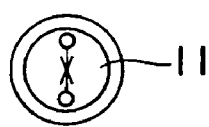
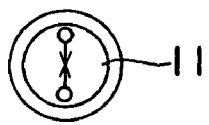

US 6,926,516 B1

COMBUSTION METHOD AND BURNER

TECHNICAL FIELD

The present invention relates to an improvement in a burner apparatus and a combustion method thereof. More particularly, the present invention relates to an improvement in a burner apparatus for performing non-oxidizing combustion or reduction combustion and a combustion method thereof.

BACKGROUND ART

In respective fields of iron and steel, non-ferrous metal, ceramics and others, non-oxidizing reduction combustion with an air ratio of 0.5 to 0.95 (operating air ratio varies depending on each target furnace) is conventionally carried out in order to reduce an oxidation or generation scale, or improve or reform a material quality in a heat treatment step of a material. For example, in case of a ceramic baking furnace 102 shown in FIG. 16 as a typical example of a prior art non-oxidizing combustion furnace, a plurality of reduction type burners (capable of performing combustion at an air ratio not more than the theoretical air ratio) 101 are set so that a work 103 is heated in this non-oxidizing atmosphere (for example, an ordinary temperature to 1,250° C.), extracted and carried to a next processing step. Although generation of soot is suppressed as much as possible by a well-designed mixing mechanism in the burners 101, generation of CO can not be of course avoided. Thus, usually, CO is burned in an after burner 104 provided in the vicinity of an outlet of the furnace, and exhaust gas is then passed through a recuperator 105 provided at one position. In this recuperator, heat exchange with combustion air is carried out, and the exhaust gas is emitted from a stack 108 at usually 300 to 400° C. Also, there are many facilities which do not have the recuperator 105. It is to be noted that reference numeral 106 in the drawing denotes a blower and 107 designates an exhaust fan.

In such non-oxidizing reduction combustion, fuel which mainly contains gas is used. In case of low air ratio combustion and combustion at a ratio not more than the theoretical air ratio, however, a large amount of soot as well as CO is apt to be generated in combustion gas in regular burners, and it is hard to stably maintain combustion.

Thus, in the non-oxidizing reduction burner, there are made special contrivances such as acceleration of initial mixing of fuel and air for suppressing occurrence of free $O_2$ (remaining $O_2$) or preliminary mixing of a part of air into fuel for increasing stability. For example, as in the burner 101 shown in FIG. 17, there is provided a mixing structure which emits a jet of combustion air led from an air intake 114 from an air nozzle 111 having several tens of small holes circularly arranged around a fuel injection nozzle 113 at an inlet part of a burner time 110 with a strong swiveling action so that initial mixing of fuel gas and combustion air is rapidly performed in a space 112 of the burner time 110. In case of the burner 101 having this mixing structure, smoke is not emitted at up to an air ratio of approximately 0.6. It is to be noted that the reference numeral 115 in the drawing denotes a pilot burner.

However, in the conventional non-oxidizing burner 101 having the mixing mechanism shown in FIG. 17, the energy can not be saved, and occurrence of soot can not be further suppressed. That is, even if smoke is not emitted, the Bacharach smoke number of approximately 3 is presented, and this is an extent that cannot be admitted as release of fume. Further, since such a non-oxidizing burner 101 as shown in FIG. 10 requires a complicated mixing mechanism and the burner tile 110 in order to assure the mixing property, there is a limit in dimension, and the number of burners must be increased when scale-up (increase in a quantity of combustion) is necessary. Even if a plurality of burners are tried to be assembled, they can not be accommodated. Furthermore, since air and fuel are rapidly mixed (turbulent diffusion mixing) immediately after injection and pre-mixed combustion is carried out, a range of stable combustion conditions is narrowed unless a flame stabilizing mechanism is satisfactory. Moreover, since a mixing ratio approximates to the air ratio of 1.0, a flame maximum temperature is heightened and generation of NOx is rapidly increased.

On one hand, although there is carried out an attempt that the regenerative burner technique which is superior in the energy saving, the low NOx property and the uniform temperature distribution characteristic is applied to non-oxidizing reduction atmosphere combustion with the air ratio of 0.5 to 0.95, this is yet to come into practical use.

On the other hand, since the regenerative burner preheats combustion air to 1000° C. or a higher temperature, NOx is apt to be generated. Therefore, injection nozzles for fuel and air are separated from each other by a predetermined distance or a longer distance, and initial mixing is delayed by injecting fuel in parallel to an air jet. At the same time, the gas circulation effect in the furnace is utilized to the fullest by using the high-speed air jet. Therefore, the high-temperature air is diluted with the exhaust gas, and the combustion reaction is effected in the low-oxygen state so that high-temperature areas are not locally formed in the flame, thereby reducing NOx.

In addition, in case of the regenerative burner, its pre-heated air temperature is higher (700 to 1,000° C.) than that of a regular non-oxidizing burner, and this temperature is close to a soot generation temperature range of an usual hydrocarbon-based fuel. Therefore, the regenerative burner tends to advance generation of stool as compared with the regular burner.

Accordingly, since there is obtained slow combustion that initial mixing is extremely delayed in the non-oxidizing reduction combustion with a ratio less than the theoretical air ratio, soot is necessarily generated. According to experiments by the present inventor, the Bacharach smoke number was approximately 8 to 9, and a large quantity of NOx was generated.

Additionally, occurrence of soot results in occlusion of the regenerator, and there is fear of reduction in performance of the regenerator, increase in pressure losses and increase in frequency of maintenance.

Further, since the high-temperature gas (not less than 1,000° C.) flows backwards into the burner in a short period (an air throat, i.e., an air passage also functions as an exhaust gas passage), it is hard to provide a complicated initial mixing mechanism for fuel and air such as the non-oxidizing burner shown in FIG. 17 due to the thermal restriction and a limit in pressure losses, and use of metal is also restricted. Therefore, such a burner is yet to come into practical use.

As a basic method for restricting generation of NOx in combustion, there are (1) reduction in a flame temperature, (2) reduction in oxygen density, and (3) shortening a staying time. Thus, in general, it is considered that a high-temperature area is generated in the flame when air having high oxygen density is rapidly mixed with fuel, thereby rapidly increasing thermal NOx. Therefore, in order to suppress generation of NOx, fuel or combustion air is injected in two stages to cause so-called thick and thin fuel combustion so that the flame is prevented from reaching a high temperature, or combustion gas is forcibly circulated in the burner by a flowing wake generated by jet flows of air and fuel so that the oxygen density in this area can be lowered, and dilution of fuel is accelerated to lower a flame temperature so that a quantity of NOx to be generated can be decreased.

Further, in recent years, for the purpose of energy saving, there is proposed a regenerative burner which collects heat of combustion exhaust gas by utilizing a regenerator and uses the collected heat for preheating combustion air to be again put into the furnace. In this burner, combustion air itself is preheated to 1,000° C. or a higher temperature and NOx is apt to be generated. Furthermore, it is considered that air having the high oxygen density and fuel are rapidly mixed as mentioned above when air and fuel are caused to collide with each other immediately after injection, and a maximum temperature of the flame is increased, thereby rapidly increasing NOx.

Therefore, there is an attempt that fuel and high-temperature air are injected into the furnace in parallel to each other with a sufficient distance maintained therebetween, rapid initial mixing of fuel and air is suppressed and, at the same time, combustion is started after a sufficient amount of exhaust gas is involved before mixing of fuel and air and the low oxygen density is then obtained.

In case of thick and thin fuel combustion using air having an ordinary temperature, since combustion can not be carried out unless air and fuel are caused to collide with each other immediately after injection and well mixed, a high-temperature area of the flame can not be satisfactorily prevented from occurring by diffusion combustion of air having the high oxygen density and fuel. Moreover, in case of the exhaust gas recirculation combustion, exhaust gas can not be sufficiently fetched into the narrow burner. It can not be said that reduction in NOx is satisfactory in the both cases.

On the other hand, in case of a combustion method utilizing high-temperature air, since a combustible mixing range of air and fuel is increased, a combustion area does not locally exist but is widely diffused, thereby sufficiently suppressing generation of NOx. On the contrary, in order to realize low-speed mixing by injecting fuel and high-temperature air into the furnace in parallel to each other with a sufficient distance maintained therebetween, a very long staying time in the furnace is required. Thus, sufficient combustion can not be performed in a narrow furnace/short furnace, and unburned fuel/CO may be disadvantageously emitted. Accordingly, a furnace having a sufficient length (a sufficient distance between a pair of burners on the combustion side and the exhaust side) is required, and there is a problem that the furnace becomes large in dimension.

Therefore, it is an object of the present invention to provide a non-oxidizing reduction combustion method and a burner apparatus capable of reducing an amount of remaining oxygen as much as possible with less generation of soot. In addition, it is another object of the present invention to provide a non-oxidizing reduction combustion method and a burner apparatus capable of applying a regenerative burner technique which is superior in the energy saving, the low-NOx property or the uniform temperature distribution characteristic to non-oxidizing reduction atmosphere combustion with an air ratio being less than the theoretical air ratio and being 0.5<m<1.0 in particular.

It is still another object of the present invention to provide a low-NOx combustion method and a burner which can obtain a flame temperature whose distribution is flat which is the same as that obtained with a long furnace length and can perform complete combustion without generating CO. Additionally, it is yet another object of the present invention to provide a low-NOx combustion method and a burner structure capable of applying a regenerative burner technique which is superior in the energy saving, the low-NOx property and the uniform temperature distribution characteristic even if a furnace length is short.

DISCLOSURE OF INVENTION

To achieve this aim, as a result of various kinds of studies/developments, the present inventor and others have discovered the following fact. That is, although it was considered that rapid mixing (turbulent diffusion mixing) of air and fuel immediately after injection causes a large amount of NOx to be suddenly generated, a quantity of free $O_2$ can be reduced as much as possible and generation of soot can be suppressed while also suppressing occurrence of NOx when a specific surface area of an air jet flow is increased and air and fuel are caused to collide with each other in a predetermined range. In other words, it is conventionally considered that a flame maximum temperature can be heightened and a quantity of NOx to be generated can be rapidly increased wherever air and fuel are caused to collide with each other when there is velocity energy which is sufficient for causing mixing in the very strong turbulent flow state of combustion air and fuel. In particular, it has been conventionally considered that this tendency becomes prominent when combustion air is preheated to a high temperature close to a combustion exhaust gas temperature. However, the present inventor and others have found that it is possible to effect combustion within a range of sufficient turbulent strength and with the low oxygen density by changing a cross sectional shape of an air jet flow and causing air and fuel to collide with each other in a predetermined range.

Furthermore, the present inventor and others have revealed that flames can be shortened while suppressing generation of NOx when a specific surface area of an air jet flow is increased and air and fuel are caused to collide with each other. That is, it has been conventionally considered that a flame maximum temperature can be heightened and a large quantity of NOx is rapidly generated wherever air and fuel are caused to collide with each other only when there is velocity energy which is sufficient for causing mixing in the very strong turbulent flow state of combustion air and fuel. In particular, it has been considered that this tendency becomes prominent when combustion air is preheated to a high temperature close to a combustion exhaust gas temperature and then supplied. However, the present inventor and others have found that it is possible to perform combustion within a range of sufficient turbulent strength and with the low oxygen density by changing a cross sectional shape of an air jet flow and causing air and fuel to collide with each other in a predetermined range.

The combustion method of this invention is based on the above-described knowledge. By this method, combustion air has a jet flow cross section with a specific surface area which is larger than that in case of supplying the same amount of combustion air from a circular throat is injected into the furnace having a furnace temperature of not less than 800° C., and fuel is injected toward this air jet flow. Then, fuel is rapidly mixed with the air jet flow having the strong turbulence before fuel loses its velocity energy. Moreover, the burner according to the present invention includes an air throat which forms a jet flow cross section having a specific surface area larger than that in case of supplying the same amount of combustion air from a circular throat and emits a full amount of a combustion air jet into the furnace, and a fuel nozzle which injects fuel into the furnace at a position away from an injection opening of the air throat by a specific distance in order that the air jet flow is caused to collide with fuel before the velocity energy is lost.

In this case, since a specific surface area of the air jet flow is large and the air jet flow is brought into contact with the surrounding combustion gas and fetched in a large area, the oxygen density is rapidly lowered immediately after injection, and the oxygen density is sufficiently low when the air collides with fuel having the sufficient velocity energy required for turbulent diffusion mixing which still involves strong turbulences after injection. In addition, under a condition that the furnace temperature is not less than 800° C., the air jet flow is mixed with the gas in the furnace with a short distance therebetween, diluted and preheated, thereby increasing an air temperature. Therefore, even if a temperature of supplied air is much lower than a temperature which is at least not less than a self-ignition temperature required for stably performing combustion in a system having no flame stabilizing mechanism, for example, if the air temperature is 400° C., it can readily reach a temperature required for high-temperature air combustion, i.e., 800° C. before coming into contact with a fuel jet flow. Thus, it is good enough that a temperature of supplied air is not less than 200 to 300° C. with respect to an air temperature of not less than approximately 800° C. which is a necessary condition for the high-temperature air combustion. Since the turbulence stirring effect of the air jet flow is improved, combustion can be effected in a wider temperature range than a conventional air temperature range.

Therefore, even if the fuel and the air jet flow are rapidly mixed with strong turbulences, flames having a flat temperature distribution can be stably formed without involving generation of locally high temperature areas because there is no part having the high oxygen density in the jet flow of combustion air. That is, in case of performing non-oxidizing reduction combustion with an air ratio of less than 1, when the oxygen density of combustion air is reduced and the fuel jet flow and the air jet flow are rapidly subjected to initial mixing with the strong turbulence, an amount of free $O_2$ can be reduced as much as possible, and generation of unburned soot and that of NOx can be simultaneously suppressed. In addition, according to the present invention, since the regenerative burner which can not be conventionally applied can be applied to non-oxidizing reduction combustion, an exhaust gas temperature at an outlet of the furnace can be lowered to a temperature close to an acid dew point, and energy saving of not less than 30% is possible as compared with the prior art burner. Additionally, a reduction ratio of a quantity of NOx to be generated can be 50% or lower as compared with the prior art burner by high-temperature air combustion, and a temperature distribution in a combustion field can be extremely flat. Therefore, the quality can be improved, and a flame length can be shortened 10 to 30%. Further, in case of turbulent diffusion combustion with an air ratio of not less than 1, a flame shorter than that during low-speed mixing combustion can be obtained, but it is possible to obtain a flame having a flat temperature distribution without locally generating a high-temperature area, which is the same as that of low-speed mixing combustion. Therefore, an extremely-high-temperature hot blast can be effectively generated in the vicinity of a refractory allowable maximum limit.

Further, according to the present invention, in a non-oxidizing reduction combustion method, combustion air is preheated to a high temperature close to a temperature of combustion exhaust gas by collecting heat of combustion exhaust gas exhausted through a regenerative medium, and then supplied. Further more, according to a burner of the present invention, in the non-oxidizing reduction combustion burner, an air throat includes a regenerative medium and flow path switching means which alternately leads combustion exhaust gas and combustion air to the regenerative medium, and combustion air preheated to a high temperature close to a combustion exhaust gas temperature is injected into a furnace through a regenerator.

In this case, combustion air injected into the furnace through the regenerator at a high speed already has a temperature not less than a self-ignition temperature of mixed gas when it is preheated to a high temperature close to an exhaust gas temperature and injected into the furnace. Therefore, combustion air is brought into contact with surrounding combustion gas in a wide area immediately after injection into the furnace, and combustion air whose oxygen density has been rapidly lowered is speedily mixed with fuel before losing the velocity energy which is required and sufficient for turbulent diffusion mixing involving the strong turbulences. At the same time, combustion is started. Furthermore, even if both the combustion air and the fuel are rapidly mixed before losing the velocity energy which is necessary and sufficient for turbulent diffusion involving the strong turbulences, a locally high temperature area is not generated since the oxygen density of the combustion air is satisfactorily lowered. Moreover, combustion air preheated to a high temperature becomes a high-speed flow and activates behavior/circulation of combustion gas in a combustion chamber or in the furnace. In addition, combustion air makes a temperature distribution in the combustion chamber flat (forming a combustion field having a flat temperature distribution without locally high temperature areas). That is, with the oxygen density of combustion air being reduced, the fuel jet flow and the air jet flow are rapidly subjected to initial mixing while involving the strong turbulences, and the circulation effect of exhaust gas in the furnace is accelerated. With an air ratio of less than 1, an amount of free $O_2$ can be reduced as much as possible, and it is possible to of not less than 1, the short flame can be realized without increasing a quantity of NOx. Specifically, a regenerative burner having the high energy saving effect can be applied to turbulent diffusion combustion.

Moreover, according to the present invention, in a non-oxidizing reduction combustion method, combustion air is formed into a jet flow which is flat and has a thin thickness as a whole. In this case, the dilution effect by combustion gas is further enhanced by great increase in a specific surface area of the air jet flow, and a flow part having the high oxygen density/a jet flow having no core is formed when air collides with fuel. Thus, with the air ratio of less than 1, initial mixing can be rapidly performed and combustion can be carried out without having the high oxygen density parts but with the low oxygen density parts as a whole in the range of sufficient turbulence strength. As a result, an amount of soot to be generated can be reduced as much as possible, and occurrence of NOx can be also suppressed. In addition, in case of turbulent diffusion combustion with the air ratio of not less than 1, the short flame can be realized without increasing NOx.

Additionally, according to the present invention, in a non-oxidizing reduction combustion method, fuel is injected from at least two injection openings and caused to collide with an air jet flow having an increased specific surface area in a wide area, and this fuel is rapidly mixed with the air jet flow with the strong turbulences. In this case, a contact area between air and fuel is also increased, and mixing can be effected at a higher speed. Therefore, with the air ratio of less than 1, an amount of free $O_2$ can be reduced as much as possible, and generation of unburned soot can be decreased as much as possible. Further, generation of NOx can be also suppressed, thereby realizing the short flame without increasing NOx with the air ratio of not less than 1.

Furthermore, according to the present invention, in a non-oxidizing reduction combustion method, a plurality of fuel jet flows are formed, and the fuel jet flows collide with each other before colliding to the air jet flow. In this case, since a flat fuel jet flow which flatly spreads can be obtained when the fuel jet flows collide with each other before coming in contact with the air jet flow, a contact surface area between fuel and high-temperature furnace gas is increased. As a result, the fuel jet flow is diluted/preheated (condition of a furnace temperature of not less than 800° C.) at a position away from a fuel injection portion by a very short distance as compared with a case of a circular jet flow. Therefore, fuel has a high temperature, and a calorific value is sufficiently low. Furthermore, combustion air also has a high temperature and includes no part having the high oxygen density. Thus, even if rapid initial mixing is carried out with the strong turbulences, the stability of an ignition source can be maintained in a wide range of the supplied air temperature, and the combustion reaction is accelerated. Moreover, a quantity of free $O_2$ can be greatly decreased and an amount of soot to be produced can be reduced as much as possible.

Additionally, according to the present invention, in a non-oxidizing reduction combustion method, a plurality of air jet flows are formed, and the air jet flows collide with each other before coming in contact with a fuel jet flow. In this case, a flat air jet flow which flatly spreads can be obtained when the air jet flows collide with each other before coming in contact with the fuel jet flow. Thus, as a result of increase in a contact surface area with respect to the high-temperature furnace gas, combustion air can be diluted/preheated (condition of the furnace temperature of not less than 800° C.) by combustion gas without being greatly distanced from the air injection portion as compared with a case of a circular jet flow. At this moment, since combustion air has a high temperature and the oxygen density is sufficiently lowered so that there is no part with the high oxygen density, even if combustion air is mixed with fuel in that state, the stability of an ignition source can be maintained in a wide range of the supplied air temperature, and combustion generating no area having a locally high temperature can be formed. At the same time, the combustion reaction is accelerated and an amount of free $O_2$ can be reduced as much as possible, and minimization of a quantity of soot to be generated can be realized. With the air ratio of not less than 1, the short flame can be realized without increasing NOx.

Further, according to the present invention, in a non-oxidizing reduction combustion method, a plurality of fuel jet flows and air jet flows are formed, the air jet flows collide with each other and the fuel jet flows collide with each other before the fuel jet flows come in contact with the air jet flows. In this case, since a flat jet flow which flatly spreads can be obtained when the fuel jet flows collide with each other before coming in contact with the air jet flows, a contact surface area between fuel and high-temperature furnace gas is increased. Consequently, the fuel, jet flows are diluted/preheated (condition of the furnace temperature of not less than 800° C.) without largely distanced from the fuel injection portion as compared with a case of a circular jet flow. At the same time, the air jet flows are also formed into a flat jet flow which flatly spreads when the air jet flows collide with each other before coming in contact with the fuel jet flow, and hence a high temperature is obtained, and the oxygen density is sufficiently lowered. Accordingly, when fuel has a high temperature, and the calorific power is sufficiently decreased, combustion air has a high temperature and includes no locally high oxygen density part. Therefore, even if initial mixing is rapidly carried out with the strong turbulences, the stability of an ignition source can be maintained in a wide range of the supplied air temperature, and combustion generating no locally high temperature area can be formed. At the same time, the combustion reaction is accelerated. With the air ratio of less than 1, an amount of free $O_2$ can be reduced as much as possible, and minimization of a quantity of soot to be produced can be realized. With the air ratio of not less than 1, the short flame can be realized without increasing NOx.

Moreover, according to the present invention, in a non-oxidizing reduction combustion method, a plurality of pairs of the combustion jet flow and the air jet flow which collide with each other in the furnace are formed, thereby forming a large combustion field.

In addition, in a burner according to the present invention, when a quantity of combustion air supplied from an air throat is less than the theoretical air quantity and high-temperature air combustion forming the non-oxidizing atmosphere or the reduction atmosphere is effected, fuel is injected with a ratio de/Dpcd of a corresponding diameter de of an opening of the air throat and a gap ½ Dpcd from the center of the air throat to the center of a fuel nozzle falling within a range of 0.1 to 0.5 and with a ratio La/de of the corresponding diameter de of the air throat with respect to a distance La from an intersection of a fuel injection axis and a plane on the central axis in the air throat longitudinal direction to an outlet surface of the air throat falling within a range of 1.0 to 5.0. When the air throat and the fuel nozzle are arranged within this range, the fuel jet flow and the air jet flow are caused to collide with each other while fuel has the velocity energy which is necessary and sufficient for turbulent diffusion mixing involving strong turbulences with the oxygen density of combustion air being sufficiently low. In this case, since fuel and air are rapidly mixed by turbulent diffusion mixing involving strong turbulences, an amount of free $O_2$ to be produced can be reduced as much as possible, and generation of soot and that of NOx can be suppressed. Specifically, when, for example, 13A city gas was burned by using a regenerative burner shown in FIGS. 1 and 2, an amount of generated soot was suppressed to 0.06 g/Nm³ or lower (Bacharach smoke number of 1) with the air ratio of 0.8 (theoretical CO generation wet gas density of approximately 3.6%) at a furnace temperature of 1,000° C. Since an amount of generated soot is not less than 0.13 g/Nm³ (Bacharach smoke number of 9) when the regenerative burner is burned under the same conditions, reduction of approximately 54% was realized.

Moreover, in a burner according to the present invention, when a quantity of combustion air supplied from the air throat is not less than the theoretical air quantity and high-temperature air combustion by turbulent diffusion mixing is carried out, fuel is injected with a radio de/Dpcd of a corresponding diameter de of an opening of the air throat and a gap ½ Dpcd from the center of the air throat to the center of the fuel nozzle falling within a range of 0.1 to 0.5 and a ratio La/de of the corresponding diameter de of the air throat with respect to a distance La from an intersection of a fuel injection axis and a plane on the central axis in the air throat longitudinal direction to an outlet surface of the air throat falling within a range of 2.0 to 10.0. When the air throat and the fuel nozzle are arranged within this range, the fuel jet flow and the air jet flow are caused to collide with each other while fuel has the velocity energy which is necessary and sufficient for turbulent diffusion mixing involving the strong turbulences and the oxygen density of the combustion air is satisfactorily low. With the air ratio of not less than 1, if La/de=0.2 to 10.0, a further shorter flame can be obtained as compared with that in case of low-speed mixing since fuel and air are rapidly mixed by turbulent diffusion mixing involving the strong turbulences. That is, complete combustion can be effected with a short flame length. As apparent from an experimental result shown in FIG. 11, the flame length is shortened if the calorific power remains unchanged. For example, in case of a burner output of 330 Kw, when air and fuel are injected into the furnace in parallel with a predetermined distance maintained therebetween and mixed at a low speed (La/de=∞, α=0°), approximately 7 m of the visible flame length is required for complete combustion. On the other hand, when air and fuel are caused to collide with each other within a predetermined range (de/Dpcd=0.1 to 0.5, La/de= 5.0, α=20°) from the injection opening as in the burner and the combustion method according to the present invention, only approximately 5.2 m of the flame length is required. Therefore, the furnace length can be shortened by this difference in the flame length. Also, even if the furnace length is short, complete combustion can be performed without generating CO. Further, it is possible to obtain a flame temperature which is the same as that when the furnace length is long. Furthermore, as apparent from the experimental result shown in FIG. 10, an amount of NOx to be generated can be reduced. For example, an amount of NOx can be decreased to approximately 50 ppm with the air ratio m=1.03 and 80 ppm or lower with the air ratio m=1.1 by the reduced level conversion of 11% $O_2$. Incidentally, since a value of de/Dpcd does not largely affect the flame length, the flame length does not greatly change in a range from 0.1 to 0.5.

Moreover, according to the present invention, in the burner, the air throat has a flat rectangular opening. An air jet flow formed in this case is flat and its specific surface area is exponentially increased as compared with the counterpart injected from a circular air throat. This activates contact with combustion gas and enhances the dilution effect, and a jet flow which does not have a high oxygen density portion/core can be hence formed when the air jet flow collides with fuel with the strong turbulences. Accordingly, in combustion with the air ratio of less than 1, an amount of free $O_2$ can be considerably reduced, rapid initial mixing is carried out with the strong turbulences. A quantity of soot to be generated can be minimized, and production of NOx can be further suppressed. In combustion with the air ratio of not less than 1, the short flame can be realized without increasing a quantity of NOx.

Moreover, according to the present invention defined in claim 13, a specific surface area can be increased by dividing the air throat into a plurality of small holes. In this case, the specific surface area can be readily greatly increased as compared with the air throat consisting of a single perfect circle, and the distribution of temperature can become flat by scattering of the flames.

In addition, according to the present invention, the air throat is divided into a plurality of small holes and respective jet flows are arranged in a row so as to be connected to each other without being independent in order to form a jet flow having a flat cross sectional shape as a whole. In this case, the specific surface area becomes larger than that of a jet flow formed by the circular air throat and the oxygen density can be further rapidly decreased, as similar to the case of a flat rectangular throat.

Additionally, according to a burner of the present invention, a plurality of small holes form jet flows in which air jet flows collide with each other before coming in contact with fuel jet flows. In this case, since a plurality of flat jet flows which flatly spread can be obtained by a plurality of small holes when air jet flows collide with each other before coming in contact with fuel jet flows, a contact surface area of the jet flows with respect to the high-temperature furnace gas can be greatly increased as compared with the case of a single flat jet flow. As a result, combustion air is diluted/preheated (condition of the furnace temperature of not less than 800° C.) with a distance from the air injection portion being extremely reduced as compared with the case of the circular jet flow. At this moment, a jet flow having a flat cross sectional shape can be formed when air jet flows collide with each other even if a flat air throat is not used, and the same effects as those obtained by a jet flow from the flat air throat can be obtained. That is, since the combustion air has a high temperature and the oxygen density is sufficiently lowered with no high oxygen density portion being provided, the stability of an ignition source can be maintained in a wide range of the supplied air temperature and combustion is formed without forming a locally high temperature area even if combustion air is mixed with fuel in this state. At the same time, the combustion reaction is further accelerated to extremely reduce an amount of free $O_2$, thereby realizing minimization of generation of soot.

Furthermore, according to the present invention, in a non-oxidizing reduction combustion burner, a fuel nozzle has at least two injection openings so that fuel can collide in a wide area with an air jet flow having an increased specific surface area. In this case, a contact area of combustion air with respect to fuel can be increased, and initial mixing by turbulent diffusion can be rapidly and extensively effected.

Moreover, according to the present invention, in a non-oxidizing reduction combustion burner, the fuel nozzle has at least two injection openings so that a jet flow in which fuel jet flows emitted from respective injection openings collide with each other before coming in contact with an air jet flow is formed. In this case, since a flat jet flow which flatly spreads can be obtained when the fuel jet flows collide with each other before coming in contact with an air jet flow, a contact surface area between the fuel and the high-temperature furnace gas is increased. As a result, the fuel jet flows are diluted/preheated (condition of the furnace temperature of not less than 800° C.) with a distance from the fuel injection portion being extremely reduced as compared with the case of a circular jet flow. Therefore, fuel has a high temperature and a calorific value is sufficiently low. In addition, combustion air also has a high temperature and there is no part having the high oxygen density. Thus, even if initial mixing is rapidly carried out with the strong turbulences, the stability of an ignition source can be maintained in a wide range of the supplied air temperature, and the combustion reaction is accelerated, and an amount of free $O_2$ can be reduced as much as possible, and minimization of generation of soot can be realized.

In addition, according to the present invention, in a non-oxidizing reduction combustion burner, a plurality of fuel nozzles are arranged so as to surround an air jet flow. In this case, a contact area of air with respect to fuel can be increased, and initial mixing by turbulent diffusion can be extensively and rapidly performed.

Additionally, according to the present invention, in a non-oxidizing reduction combustion burner, a plurality of fuel nozzles form a jet flow in which fuel jet flows collide with each other before coming in contact with an air jet flow. In this case, since a flat jet flow which flatly spreads can be obtained when fuel jet flows collide with each other before coming in contact with an air jet flow, a contact surface area between the fuel and the high-temperature furnace gas is increase. As a result, the fuel jet flows are diluted/preheated (condition of the furnace temperature of not less than 800° C.) with a distance from the fuel injection portion being extremely reduced as compared with the case of circular jet flow. Therefore, fuel has a high temperature, and a calorific value is sufficiently lowered. Also, combustion air has a high temperature and there is no part having the high oxygen density. Thus, even if rapid initial mixing is performed with the strong turbulences, the stability of an ignition source can be maintained in a wide range of the supplied air temperature, and the combustion reaction is accelerated, and an amount of free $O_2$ can be reduced as much as possible, and minimization of generation of soot can be realized.

In addition, according to the present invention, in a non-oxidizing reduction combustion burner, a plurality of air jet flows and fuel jet flows are formed, and there are formed jet flows in which the air jet flows collide with each other while the fuel jet flows collide with each other before the air jet flows come in contact with the fuel jet flows. In this case, it is possible to obtain flat jet flows of fuel and combustion air which flatly spread when air jet flows collide with each other and fuel jet flows collide with each other before air jet flows and fuel jet flows come in contact with each other. Therefore, a contact surface area of the fuel and the high-temperature furnace gas and that of the combustion air and the furnace gas are greatly increased as compared with the case of the circular jet flows. As a result, the fuel and the combustion air are diluted/preheated (condition of the furnace temperature of not less than 800° C.) with a distance being extremely reduced from each injection portion. Thus, the fuel has a high temperature, and a calorific value is sufficiently lowered. Also, the combustion air has a high temperature, the oxygen density is satisfactorily decreased, and there is no part having a locally high temperature portion. Therefore, even if the fuel and the combustion air are subjected to initial mixing with the strong turbulences, the stability of an ignition source can be maintained in a wide range of the supplied air temperature, and combustion formation can be obtained without generating a locally high temperature area. At the same time, the combustion reaction is accelerated, and an amount of free $O_2$ can be reduced as much as possible, and minimization of generation of soot can be realized.

Moreover, according to the present invention, in a non-oxidizing reduction combustion burner, a ceramic honeycomb is included as a regenerative medium. Here, it is preferable that the number of cells of the honeycomb is 10 to 200 cells/in$^2$. In this case, the pressure loss is much lower than that of a regenerator in which nuggets or blocks are filled. Therefore, even if soot and the like is generated, the performance is hardly deteriorated by clogging or fouling of such soot. Further, since the pressure loss is small, the combustion air can be injected into the furnace at a high speed by the low supply power. Thus, the gas in the furnace can be actively agitated to encourage uniformization of the furnace temperature distribution, and generation of NOx is suppressed. Also, convection heat transfer between the regenerator and the air or the exhaust gas flowing in the regenerative medium at a high speed without turbulences can be improved, and it is possible to follow up changes in temperature in a very short time by a thin cell thickness as compared with the case of a regenerator having, e.g., nuggets. Therefore, a high-speed switching is enabled with the capability as the regenerator being fully utilized, and the temperature efficiency of heat exchange can be increased. Furthermore, the furnace temperature can be increased or decreased within a short time, and preheated air having a high temperature is supplied to improve the energy saving effect.

Moreover, according to the present invention, in a non-oxidizing reduction combustion burner, the regenerative medium is included in the air throat of a burner body, and flow switching means is directly connected to the burner body so that combustion air and exhaust gas are switched very near the burner body. In this case, an air supply delay time of air charging/exhaust at the time of burner switching is minimized, and the CO density is stabilized. At the same time, an amount of free $O_2$ at the time of switching is reduced as much as possible. That is, a purge capacity for a duct between the regenerative medium and the flow switching means is no longer necessary, and an amount of exhaust gas remaining in that duct is thereby also reduced. A quantity of purge air at the time of switching becomes very small. Therefore, the oxygen density can be prevented from being increased, and it is possible to prevent the adverse effect of free $O_2$ in heat treatment and the like in which such high density should be avoided.

Additionally, according to the present invention, in a non-oxidizing reduction combustion burner, a plurality of pairs of an air throat and a fuel nozzle are set to constitute a large combustion machine. In this case, by arranging a plurality of pairs of the air throat and the throat which accommodates the fuel nozzle in, for example, an annular form arranging them in alignment in the vertical direction or the horizontal direction or arranging them radially according to needs, a large combustion machine can be constituted as the need arises.

Specifically, when, for example, 13A city gas was burned by using a regenerative burner shown in FIGS. 1 and 2, an amount of generated soot was suppressed to 0.06 g/Nm$^3$ or lower (Bacharach smoke number of 1) with the air ratio of 0.8 (theoretical CO generation wet gas density of approximately 3.6%) at a furnace temperature of 1,000° C. Since an amount of generated soot is not less than 0.13 g/Nm$^3$ (Bacharach smoke number of 9) when the regenerative burner is burned under the same conditions, reduction of approximately 54% was realized.

And, with the air ratio of not less than 1, if La/de=0.2 to 10.0, a further shorter flame can be obtained as compared with that in case of low-speed mixing since fuel and air are rapidly mixed by turbulent diffusion mixing involving the strong turbulences. That is, complete combustion can be effected with a short flame length. As apparent from an experimental result shown in FIG. 11, the flame length is shortened if the calorific power remains unchanged. For example, in case of a burner output of 330 Kw, when air and fuel are injected into the furnace in parallel with a predetermined distance maintained therebetween and mixed at a low speed (La/de=∞, α=0°), approximately 7 m of the visible flame length is required for complete combustion. On the other hand, when air and fuel are caused to collide with each other within a predetermined range (de/Dpcd=0.1 to 0.5, La/de=5.0, α=20°) from the injection opening as in the burner and the combustion method according to the present invention, only approximately 5.2 m of the flame length is required. Therefore, the furnace length can be shortened by this difference in the flame length. Also, even if the furnace length is short, complete combustion can be performed without generating CO. Further, it is possible to obtain a flame temperature which is the same as that when the furnace length is long. Furthermore, as apparent from the experimental result shown in FIG. 10, an amount of NOx to be generated can be reduced. For example, an amount of NOx can be decreased to approximately 50 ppm with the air ratio m=1.03 and 80 ppm or lower with the air ratio m=1.1 by the reduced level conversion of 11% $O_2$. Incidentally, since a value of de/Dpcd does not largely affect the flame length, the flame length does not greatly change in a range from 0.1 to 0.5.

And, according to the present invention, since the regenerative burner which can not be conventionally applied can be applied to non-oxidizing reduction combustion, an exhaust gas temperature at an outlet of the furnace can be lowered to a temperature close to an acid dew point, and energy saving of not less than 30% is possible as compared with the prior art burner. Additionally, a reduction ratio of a quantity of NOx to be generated can be 50% or lower as compared with the prior art burner by high-temperature air combustion, and a temperature distribution in a combustion field can be extremely flat. Therefore, the quality can be improved, and a flame length can be shortened 10 to 30%.

In addition, according to this non-oxidizing reduction combustion burner apparatus, a large recuperator whose exhaust heat collection rate is low as compared with a regenerative burner system can be eliminated so that the facility can be simplified. Although the cost of equipment as whole becomes equal to the conventional type or slightly higher, the regenerative burner type is clearly advantageous when taking into consideration the running cost since the exhaust heat collection rate is high.

And, according to the present invention, air and fuel can be mixed at a high speed, and it is possible to realize combustion in which a locally high temperature area is not formed in the flame. Therefore, an extremely-high-temperature hot blast can be effectively generated in the vicinity of a refractory allowable maximum limit.

The mixing of fuel with air can be readily realized by the burner according to the invention. When the air throat and the fuel nozzle are arranged in this range, the fuel has the velocity energy which is necessary and sufficient for turbulent diffusion mixing involving strong turbulences, while the oxygen density of the combustion air is satisfactorily lowered. In this state, the fuel jet flow and the air jet flow are caused to collide with each other. And, according to the invention, the fuel nozzle is can be arranged in a position where the fuel and the air are caused to collide with each other in the vicinity of the air injection opening without introducing mal-mixing of the air with the fuel.

Further, according to the present invention, the air dilution effect can be further enhanced by increase in a specific surface area of the air jet flow. As a result, an amount of soot to be generated can be reduced as much as possible.

Furthermore, in a non-oxidizing reduction combustion method and a burner according to claims 2 and 13, the combustion air is preheated to a high temperature (i.e., the temperature close to an exhaust gas temperature) equal to or above a self-ignition temperature of mixed gas of air and fuel through the regenerative medium, and this combustion air having the oxygen density sufficiently decreased is caused to collide with the fuel having the velocity energy which is necessary and sufficient for turbulent diffusion mixing involving strong turbulences. Thus, a certain amount of energy can be obtained using a smaller amount of fuel while suppressing generation of NOx. Therefore, energy-saving can be effected. That is, a regenerative burner having the high energy saving effect can be applied to turbulent diffusion combustion. As a result, the flame length can be shortened approximately 10 to 30%, and an exhaust gas temperature at an outlet of the furnace can be lowered to a temperature close to an acid dew point, thereby enabling energy saving of 30% or above as compared with the prior art burner. Additionally, a reduction ratio of a quantity of NOx to be generated can be reduced to 50% or lower as compared with the prior art by high-temperature air combustion, thus obtaining a very flat temperature distribution in the combustion field.

Further, according to this non-oxidizing reduction combustion burner, the facility can be simplified as compared with a case where a large recuperator is used.

Furthermore, according to the present invention, air and fuel can be mixed at a high speed, and it is possible to realize combustion by which a locally high temperature area is not formed in the flame. Therefore, a hot blast having a very high temperature can be effectively generated in the vicinity of a refractory allowable maximum limit.

Further, according to the non-oxidizing reduction combustion method and the burner in the invention, since a specific surface area of the air jet flow is greatly increased as compared with a case of a circular jet flow and the dilution effect is further enhanced. Thus, a quality of free $O_2$ can be greatly decreased and an amount of soot to be produced can be reduced as much as possible. Further, generation of NOx can be also suppressed.

Furthermore, according to the non-oxidizing reduction combustion burner in the invention, a specific surface area of the air jet flow is greatly increased as compared with a case of a circular jet flow, as well as a case of a flat rectangular throat and the dilution effect by the furnace gas can be further enhanced. As a result, generation of NOx can be further suppressed while enabling combustion to be carried out with an extremely small quantity of free $O_2$ due to the rapid initial mixing with strong turbulences.

Moreover, according to the non-oxidizing reduction combustion method and the burner in the invention, a contact area between the fuel jet flow and the air jet flow is increased and the air and the fuel can be well mixed. Thus, an amount of free $O_2$ can be greatly decreased and an amount of soot to be generated can be reduced as much as possible.

In addition, according to the non-oxidizing reduction combustion method and the burner in the invention, since a fuel jet flow which flatly spreads can be obtained when the fuel jet flows collide with each other before coming in contact with the air jet flow, a contact surface area between the fuel jet flow and the air jet flow is increased. As a result, the stability of an ignition source can be maintained in a wide range of the combustion air temperature from a low temperature to a high temperature, and the combustion reaction is accelerated at the same time. And, a quantity of free $O_2$ can be greatly decreased and an amount of soot to be produced can be reduced as much as possible.

Further, according to the non-oxidizing reduction combustion method and the burner in the invention, a flat air jet flow is effectively obtained in a short time/distance. Thus, a contact area between the air jet flow and the furnace gas is effectively increased so that the air is diluted/preheated by the furnace gas to be mixed with the fuel. At the same time, combustion can be stably performed without forming an area having a locally high temperature. And, an amount of free $O_2$ can be reduced as much as possible and minimization of a quantity of soot to be generated can be realized.

Furthermore, according to the non-oxidizing reduction combustion method and the burner in the invention, since a contact area between the fuel and the furnace gas is effectively increased in a short time/distance and the fuel itself can be diluted and an effective calorific value is dropped, generation of locally high temperature areas can be prevented and generation of NOx can be suppressed.

Moreover, according to the non-oxidizing reduction combustion burner in the invention, an air supply delay time of air charging/exhaust at the time of burner switching and a purge quantity is minimized so that switching at a high speed is enabled. Thus, a time lag in the fuel injection is almost eliminated so that one of a pair of the burners can be extinguished while the other can be ignited. As a result, an amount of free $O_2$ at the time of switching can be reduced as much as possible. Therefore, the oxygen density can be prevented from being increased at the time of switching, and it is possible to reduce the adverse effect of free $O_2$ in heat treatment in which such high density should be avoided.

In addition, since a pressure loss is much lower than that of a regenerator in which nuggets, blocks or the like are filled, a high-speed switching is enabled with the capability as the regenerator being fully utilized, and the temperature efficiency of heat exchange can be increased. Furthermore, the furnace temperature can be increased or decreased within a short time, and preheated air having a high temperature is supplied to improve the energy-saving effect. In addition, when air and exhaust gas alternately flow in the regenerative medium having the honeycomb structure, they reciprocate without generating a local turbulent flow or a low flow velocity, and hence soot does not adhere or is not deposited. Accordingly, the regenerator does not have to be cleaned or replaced even if it is used for a long time, and the maintenance is unnecessary. Additionally, according to the present invention, the performance is hardly deteriorated by clogging or fouling of the regenerative medium which is caused due to occurrence of soot. Therefore, it is possible to enable minimization of generation of soot by a burner structure making the best use of the features of high-temperature air combustion and also suppression of NOx value and minimization of free $O_2$ (remaining $O_2$) by preventing locally high temperature areas from forming in the flame.

BRIEF DESCRIPTION OF DRAWINGS

FIG. 7 are views showing an arrangement relationship between an air throat and a fuel nozzle in the burner depicted in FIG. 6, in which

FIG. 11 is a graph showing an experimental result obtained by comparing a flame length obtained by a conventional laminar diffusion combustion method and a flame length obtained by the combustion method according to the present invention;

FIG. 12 are views showing yet another embodiment of an air throat and fuel nozzles, in which

FIG. 13 are views showing a further embodiment of the air throat and the fuel nozzles, in which FIG. 13A is a front view and FIG. 13B is a vertical cross-sectional view.

FIG. 14 is a front view showing a still further embodiment of the fuel nozzles;

FIG. 15 are views showing a yet further embodiment of the air throat and the fuel nozzles, in which

FIG. 16 are views showing another embodiment of the air throat and the fuel nozzles, in which

FIG. 18 are views showing a conventional non-oxidizing burner, in which

BEST MODE FOR CARRYING OUT THE INVENTION

The structure of the present invention will now be described in detail hereinafter based on an example of illustrative embodiments.

Figure 1:
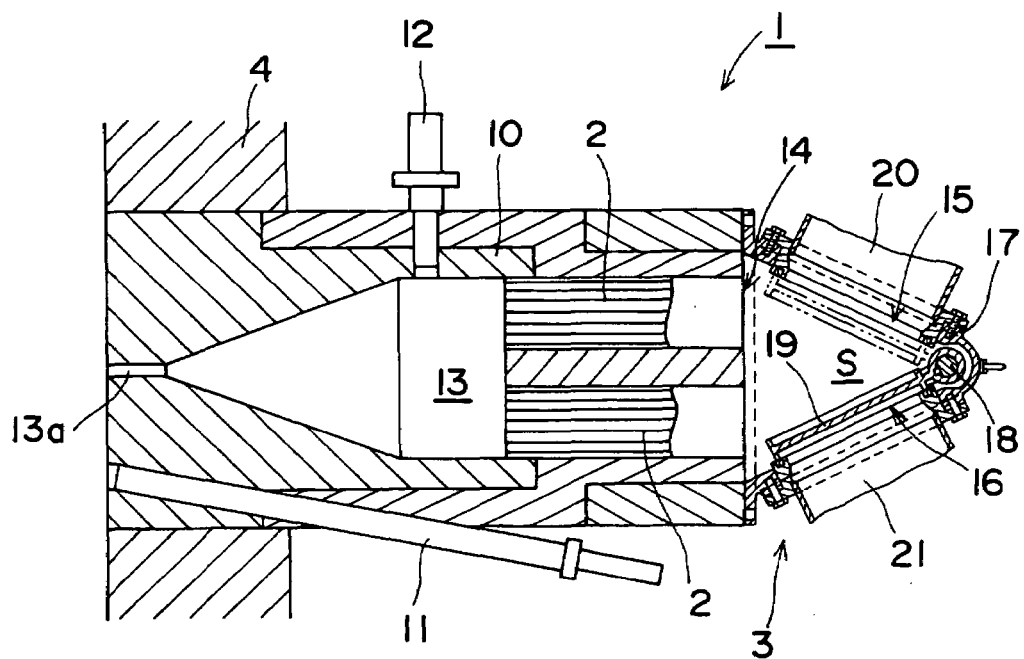
FIG. 1 is a vertical cross-sectional view showing from the center an embodiment of a non-oxidizing burner for carrying out a non-oxidizing reduction combustion method according to the present invention.

FIG. 1 shows an example of a burner for carrying out a combustion method according to the present invention. The burner 1 of this embodiment is constituted as a regenerative burner which alternately performs supply of air and exhaust of combustion gas through a regenerative medium. The two burners form a pair, and combustion is controlled by a combustion control device (not shown) so that combustion and exhaust can be alternately repeated at intervals of several ten seconds. Combustion exhaust gas passes through an inactive burner and is cooled down by giving heat to a regenerative medium which is included in the burner and has a honeycomb structure (which will be simply referred to as a regenerative medium hereinafter) 2. The combustion exhaust gas further passes through an exhaust fan (not shown) via a switch valve (three-way valve) 3 as flow switching means and reaches a stack or the like. On the other hand, the combustion exhaust gas preheats combustion air by heat collected from exhaust gas in each regenerative medium 2 included in the regenerative burner 1. Here, although not shown, the combustion exhaust gas containing CO is subjected to afterburning in a post-treatment facility such as an afterburner provided at an inlet of the stack and emitted from the stack. Meanwhile, in the regenerative burner 1, heat collected from the exhaust gas in each included regenerative medium 2 is used to preheat the combustion air. Further, this high-temperature preheated air is used to carry out non-oxidizing reduction combustion with an air ratio of less than 1 or diffusion combustion with the air ratio of not less than 1.

Figure 2:
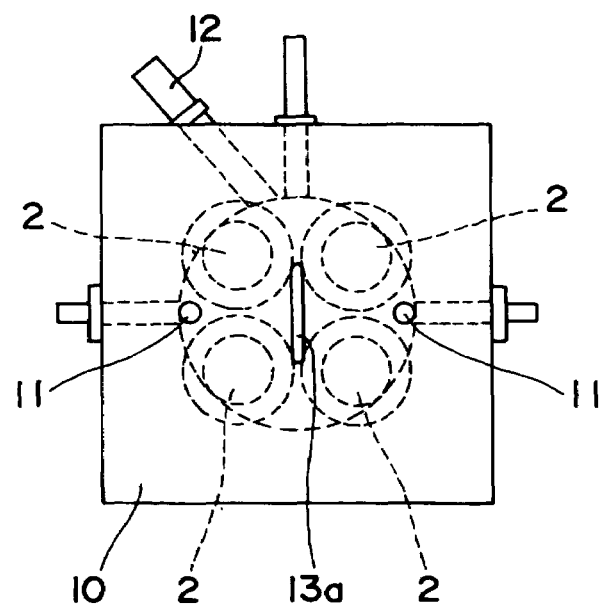
FIG. 2 is a front view of the burner illustrated in FIG. 1.

As shown in FIGS. 1 and 2 for example, each regenerative burner 1 is constituted by a regenerative medium 2, a second fuel nozzle 11, a flapper type three-way valve (switch valve) 3 as flow switching means, a burner body 10 supporting these members, and a first fuel nozzle 12 according to needs. The burner body 10 consisting of a refractory heat-resisting material includes therein the regenerative medium 2, the second fuel nozzle 11 and the first fuel nozzle 12. Furthermore, the flapper type three-way valve 3 is directly connected to a rear end of the burner body 10, and the three-way valve 3 is arranged so as not to space as much as possible between itself and the regenerative medium 2 accommodated in an air throat 13 formed by the burner body so that the combustion air and the exhaust gas can be switched very near the regenerative medium 2.

Here, the flapper type three-way valve is, as shown in FIG. 1, constituted by a housing 17 directly connected to the burner body 10, a flapper 19 which is provided in the housing 17 and opens/closes two ports 15 and 16, except a port 14, coupled to the burner body 10, a switching shaft 18 for oscillating the flapper 19 between the two ports 15 and 16, and an actuator (not shown) for driving the switching shaft 18 from the outside of the housing 17. The housing 17 has three seats including a seat directly coupled to the burner body 10, and ports 14, 15 and 16 are formed to the respective seat portions. A duct 20 of a supply system for combustion air is connected to one port 15, and a duct 21 of an exhaust system is connected to the other port 16.

An internal space S of the flapper type three-way valve 3 having the above arrangement consists of a minimum space in which the flapper 19 can oscillate. The internal space S minimizes a purge capacity at the time of switching air supply and exhaust to shorten a time required for changing the remaining exhaust gas with air so that a percentage of the time for purging in a combustion switching time can be reduced. In addition, the three-way valve 3 and the regenerative medium 2 are provided in contiguity with each other, and an amount of the exhaust gas remaining in a part extending from the three-way valve 3 to the regenerative medium 2 at the time of switching from the exhaust gas to the combustion air is very small. A purge capacity of the duct which should connect the burner body 10 with the three-way valve 3 becomes unnecessary, and a purge time and a purge gas quantity can be thereby reduced. Thus, high-speed switching in which the time required for changing the exhaust gas remaining in a part from the internal space S to the regenerative medium 2 with the air is shortened is enabled, and an amount of free $O_2$ can be reduced in case of non-oxidizing reduction combustion. Further, one regenerative burner can be quenched almost at the same of igniting the other regenerative burner. The temperature efficiency can be increased, and combustion using the high-temperature preheated air can be realized, thereby improving the energy saving effect.

Furthermore, although not shown, the second fuel nozzle 11 is provided with a pilot burner and the like according to needs, and detachably attached to the burner body 10.

Although not shown, a fuel gun assembly including a fuel shut-off magnetic solenoid valve and the like is provided at a rear end of this fuel gun.

The second fuel nozzle 11 is arranged at a position away from an outlet 13a of the air throat 13 by a specific distance with a predetermined inclination, and it is provided so that an air jet flow and a fuel jet flow are caused to collide with each other within a predetermined area away from injection openings.

Here, the predetermined area for determining a collision position means a position at which the fuel jet flow and the air jet flow can be mixed with each other with strong turbulences and the furnace gas can be sufficiently sucked into the air jet flow and preferably the fuel jet flow to reduce their oxygen density or calorific values, namely, a position at which the air jet flow can sufficiently suck in the exhaust gas to reduce the oxygen density without losing the injection/velocity energy.

Figure 3:
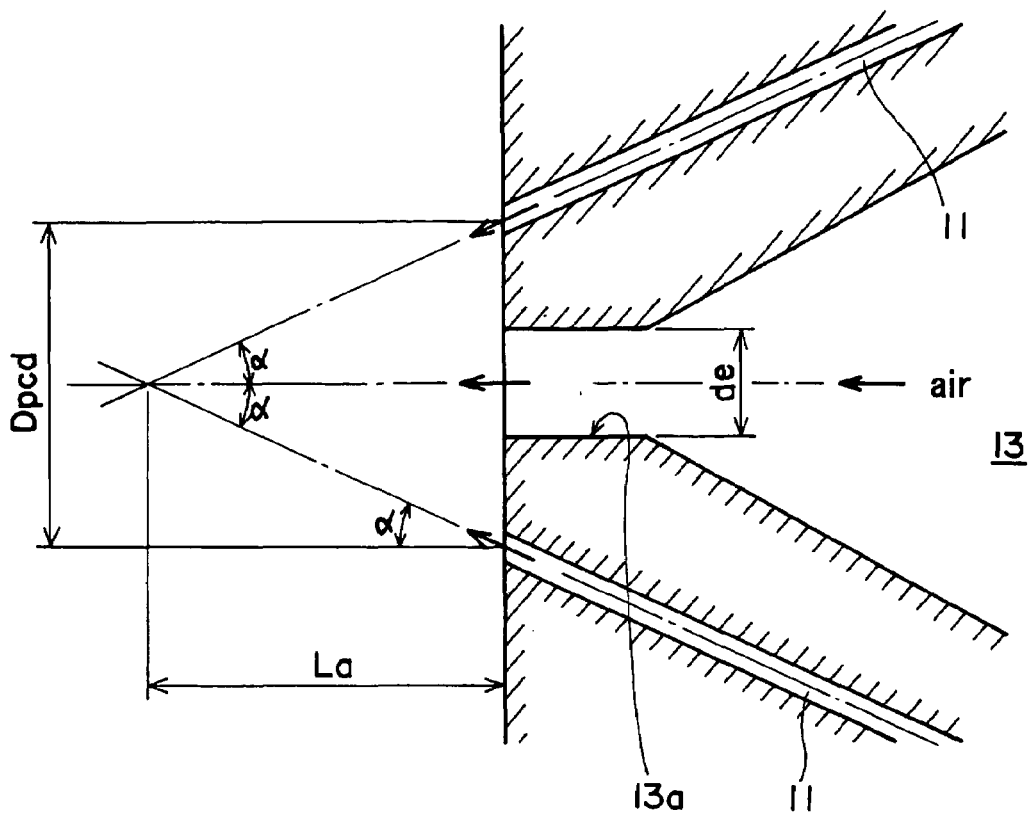
FIG. 3 is an explanatory drawing showing an appropriate collision position of a combustion air jet flow and fuel jet flows in the burner depicted in FIG. 1.

Specifically, the second fuel nozzle is provided to inject the fuel in order to cause collision with the air jet flow in the vicinity of the air injection opening and the fuel injection opening. For example, in case of non-oxidizing reduction combustion with the air ratio of less than 1, as shown in FIG. 3, in regard to a nozzle which mainly injects the fuel during the rated operation, i.e., the second fuel nozzle 11, it is preferable that a ratio de/Dpcd of a corresponding diameter (diameter obtained by converting an area to a circle) de of the air throat 13 and a gap ½ Dpcd from the center of the air throat 13 to the center of the fuel nozzle falls within a range of 0.1 to 0.5 and a ratio of the corresponding diameter de of the air throat with respect to a distance La from an intersection of a fuel jet flow axis and a plane on the central axis of the air throat longitudinal direction to an outlet surface of the air throat 13 falls within a range of 1.0 to 5.0. In this case, the fuel has the velocity energy which is necessary and sufficient for turbulent diffusion involving strong turbulences, while the oxygen density of the combustion air is satisfactorily lowered. In this state, the fuel jet flow and the air jet flow are caused to collide with each other.

Moreover, in case of diffusion combustion with the air ratio of not less than 1, it is preferable that de/Dpcd is set within a range of 0.1 to 0.5 and a ratio of the corresponding diameter de of the air throat relative to the distance La from the intersection of the fuel jet flow axis and the plane on the central axis in the air throat longitudinal direction to the outlet surface of the air throat 13 is set within a range of 2.0 to 10.0. In this case, the fuel has the velocity energy which is necessary and sufficient for turbulent diffusion involving strong turbulences, while the oxygen density of the combustion air is satisfactorily lowered. In this sate, the fuel jet flow and the air jet flow are caused to collide with each other. It is to be noted that reference character a in the drawing denotes a collision injection angle of the fuel injected from the second fuel nozzle.

A jet flow of the fuel injected from the second fuel nozzle 11 collides with the air jet flow before the velocity energy of the fuel jet flow is lost, namely, while it is still a strong turbulent flow which has large injection energy and the unabated turbulence strength, and the fuel jet flow is rapidly mixed with the air jet flow while maintaining the sufficient turbulence strength.

Figure 4:
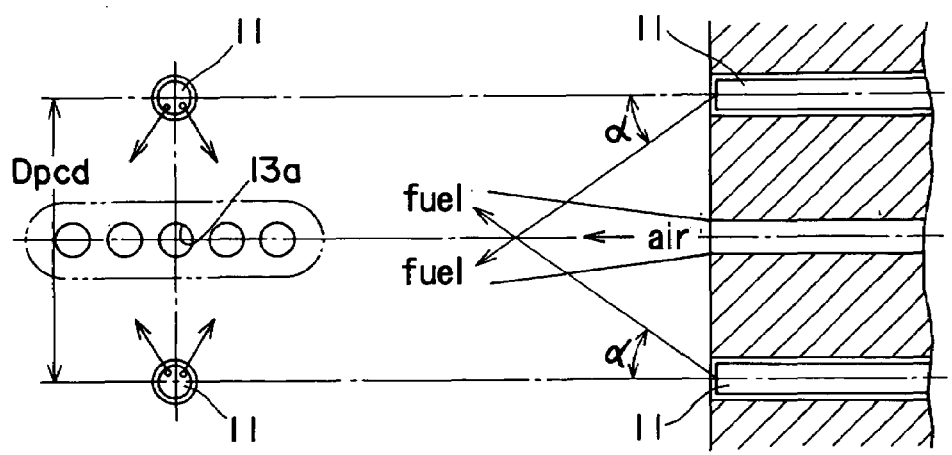
FIG. 4 is a front view and a cross-sectional view showing another embodiment of an air throat and fuel nozzles.
Figure 5:
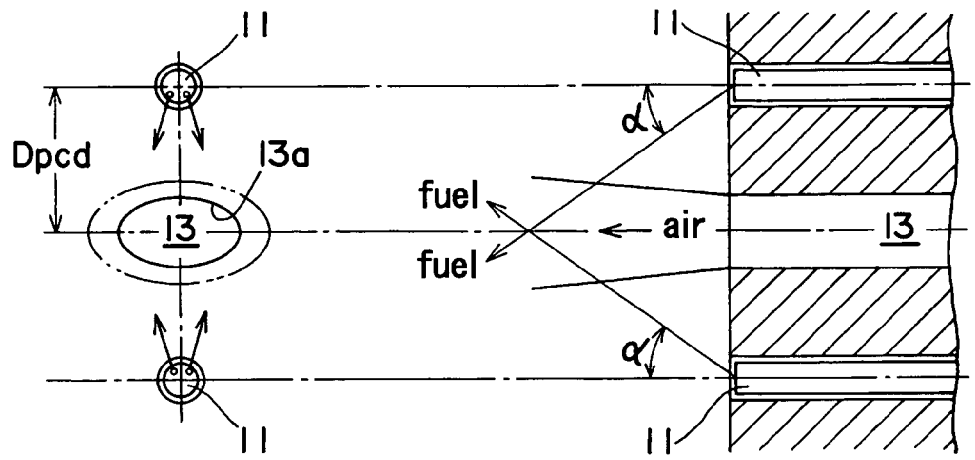
FIG. 5 is a front view and a cross-sectional view showing still another embodiment of the air throat and the fuel nozzles.

Moreover, the combustion air is injected so as to form a jet flow cross section having a larger specific surface area than that in case of supplying the same quantity of combustion air from a circular throat. For example, a jet flow having a flat cross section is formed by forming an injection opening of the air throat into a non-circular shape to make the specific surface area larger than that of the circular shape, or by fluid interference by causing the jet flows to collide with each other. Preferably, an air jet flow which has a small thickness/no core (part/flow having the high oxygen density) as a whole is formed to further increase the specific surface area. Specifically, an injection cross section which is flat as a whole, e.g., a rectangle or an ellipse is formed by a rectangle such as shown in FIG. 2, a flat ellipse such as shown in FIG. 5, or linear arrangement of circles or small holes such as shown in FIG. 4 which are obtained by dividing the injection opening into many small holes and scattered. In this case, since the furnace gas is sucked in a short period of time and the oxygen density is rapidly lowered, the oxygen density is sufficiently low when the air collides with the fuel having the strong injection energy/velocity energy.

It is preferable to provide two or more fuel nozzles 2. The fuel injected from the fuel nozzle has the small energy. Thus, the fuel loses its energy immediately after injection. Therefore, when the number of injection nozzles is increased so that fuel is injected in a wide area, turbulent diffusion mixing involving strong turbulences can be generated at a short distance from the burner by collision of the fuel in a wide area with respect to the air jet flow having the increased specific surface area. That is, it is preferable to cause the fuel to be injected possibly in the entire area of the air jet flow having the increased specific surface area with the strong turbulences. From this point of view, providing two or more fuel nozzles is preferable. It is more preferable that they are arranged so as to surround the air jet flow.

Here, reduction in the velocity of the air jet flow immediately after injection also depends on the opening shape. Taking the flat rectangular air throat 13 as an instance, assuming that a short side of the rectangle is a, a long side is b and a corresponding diameter is de, when a is designed so as to be approximately ½ to ⅕ of de, La/de=2 becomes 4 to 10 La/a. If the initial velocity remains unchanged, since the velocity attenuation is represented by La/a, the value is large in this mixing method. That is, a large velocity attenuation value means that involvement of the furnace gas is accelerated when compared by using the same distance after injection. Therefore, dilution of the air flow by the high-temperature exhaust gas reaches a predetermined condition (for example, a value of the oxygen density in air required for attaining high-temperature air combustion, e.g., not more than 10%), and the fuel can be hence injected into that area.

Similarly, as to the fuel, drop in the velocity can be determined by a fuel injection diameter df and a distance Lf required for the fuel jet flow to come in contact with the air jet flow. Therefore, "before the fuel jet flow loses its collision energy" means that the fuel comes in contact and collides with the air flow with Lf/df falling within a range of 100 to 200 in order to attain high-temperature air combustion at a short distance after injection of air. Here, although it is well known that increasing the velocity attenuation is preferable for attaining high-temperature air combustion, it has been considered that such a nozzle is not appropriate for the heating furnace because the flame is apt to come under the influence of the buoyant force. However, mixing has been recently effectively expedited in the above-described found range with the flame not being influenced by the buoyant force. As a result, even if the fuel and the air are mixed at a position closer to the burner than that in case of a single circular nozzle, there is no sudden generation of NOx which prominently occurs in the prior art, and the length of the flame is effectively shortened. It can be considered that the main factor of the above effects is that mixing is started with the turbulent flow strength of the fuel jet flow being large at the time of collision mixing because the contact position of the fuel and the air becomes closer to the burner, i.e., the injection openings.

Further, the burner body 10 has the air throat 13. An end opening 13a of the air throat 13 is narrower than a part which accommodates the regenerative medium 2, and formed into a flat rectangular shape. Furthermore, the air throat 13 injects into the furnace the combustion air whose quantity is not less than the theoretical air quantity in case of diffusion combustion at a flow velocity during usual combustion or a higher flow velocity at the time of the rated operation (a furnace temperature of not less than 800° C.). For example, in case of the gas fuel, the air throat 13 injects the combustion air having a low-excess air ratio, e.g., the air ratio m=approximately 1 to 1.2, or preferably 1.03 to 1.15, or more preferably approximately 1.1. In case of non-oxidizing reduction combustion, the air throat 13 injects into the furnace the combustion air whose quantity is substantially less than the theoretical air quantity (although the operating air ratio slightly differs depending on a type of a target furnace, the air ratio m=0.5 to 0.95 for example). Here, since control of the air ratio is difficult, the air ratio may be not less than 1 in some cases even if it is set to 1. Therefore, in order to set the air ratio to a value very close to 1 and less than the theoretical air quantity, it is general to set the air ratio to approximately 0.95. The combustion air is formed into a flat rectangular shape in accordance with the shape of the opening 13a of the air throat 13 and then injected into the furnace. Therefore, the combustion air collides with the fuel jet flow in wide area. At the same time, according to this throat shape, since the regenerative medium 2 is covered with a refractory heat resisting material constituting the burner body 10, the regenerative medium 2 can be protected from the radiant heat from the furnace.

Most preferably, the opening (injection opening) 13a of the air throat 13 is formed into an elongated slit-like rectangular shape such as shown in FIG. 2. However, the shape of the opening 13a of the air throat 13 is not restricted to an illustrated flat rectangular shape, there may be appropriately adopted an elliptical shape such as shown in FIG. 5, circles divided into small holes such as shown in FIG. 4, or any other non-illustrated shape by which the specific surface area is increased, for example, a star-like shape, a cocoon-like shape, a square or a triangle according to needs. The shape of the injection opening itself may be a circular shape in some cases. In this case, it is preferable to form a rectangular air jet flow which is substantially similar to that injected from a throat having a substantially slit-like shape by dividing the injection opening into many small circular holes and arranging these holes in alignment as shown in FIG. 4. In such cases, if a jet flow having a large specific surface area is formed, suction of the exhaust gas becomes active, and the oxygen density at the position immediately before mixing is sufficiently low even if the air is mixed with the fuel at a short distance.

This predetermined air flow velocity is obtained by appropriately designing an air blower and an exhaust fan which are not illustrated and the dimension of the air throat 13 and others. By changing the dimension of the opening 13a at the end of the air throat 13, the injection velocity (momentum) of the combustion air can be freely controlled, and the shape and the property of the flame can be varied.

Incidentally, in this embodiment, the two second fuel nozzles 11 are symmetrically arranged with respect to one air throat 13 having the regenerative medium 2 filled therein to constitute one burner unit. However, the present invention is not restricted thereto, and one burner unit may be constituted by arranging one fuel nozzle 11 to one air throat 13 or arranging three or more fuel nozzles 11 to one air throat 13. For example, when the burner is large and the air throat 13 has an elongated rectangular shape, in order to cause the fuel to evenly collide with the air jet flow, the two second fuel nozzles 11 are symmetrically arranged with the air throat 13 therebetween as shown in FIG. 2 and the fuel is injected so as to sandwich the air jet flow. However, two fuel nozzles may be arranged on each side so that four fuel nozzles are arranged in total in some cases. It is preferable to increase the number of the fuel nozzles and the number of the injection openings. For example, a plurality of the fuel nozzles are arranged so as to surround the air jet flow, or at least two injection openings are provided so that the fuel is caused to collide with the air jet flow having the increased specific surface area in a wide area.

Moreover, although the regenerative medium 2 is not restricted to specific materials or structures, it is preferable to adopt the honeycomb shape by which the calorific capacity can be increased with the relatively low pressure loss and a material having the high durability, e.g., a cylindrical body which is molded using ceramics and has a plurality of honeycomb-shaped cell holes. In this case, since the pressure loss is low for the regenerative capacity, air supply and exhaust can be carried out without particularly increasing the capabilities of the air blower and the exhaust fan. For example, this can be realized by the low pressure loss of not more than 100 mmAq. In addition, as the regenerative medium 2, it is preferable to use one having the honeycomb shape manufactured by extruding ceramics as a material, e.g., cordierite, mullite or alumina for heat exchange between a high-temperature fluid having a temperature of approximately 1000° C. such as exhaust gas and a low-temperature fluid having a temperature of approximately 20° C. such as combustion air. Additionally, the regenerative medium 2 having the honeycomb shape may be manufactured by using other ceramics or materials such as a complex $Al_2O_3$—Al, a complex a metal, e.g., heat resisting steel or a complex of ceramics and a metal, for example, a complex $Al_2O_3$—Al, a complex SiC—$Al_2O_3$—Al and the like obtained by causing spontaneous permeation of a molten metal in pores of ceramics having a porous structure and partially oxidizing or nitriding that metal to obtain ceramics so that pores are completely filled up. Incidentally, although the honeycomb shape fundamentally means a hexagonal cell (hole), it includes the original hexagonal cell as well as infinitely many quadrangular or triangular cells formed by boring in this specification. Further, the regenerative medium having the honeycomb shape may be obtained by bundling tubes or the like without performing integral molding. It is to be noted that the honeycomb shape fundamentally means a hexagonal cell (hole) but it includes the original hexagonal cells as well as infinitely many quadrangular or triangular cells formed by boring in this specification. Furthermore, the regenerative medium having the honeycomb shape may be obtained by bundling tubes or the like without performing integral molding.

Moreover, the shape of the regenerative medium 2 is not restricted to the illustrated honeycomb shape. For example, although not shown, regenerative materials having a flat plate shape or a corrugated plate shape may be radially or annularly arranged in a cylindrical medium case, or the regenerative materials having the pipe-like shape may be filled so that the fluid can pass in the axial direction. In addition, the regenerative materials having a ball-like shape or a nugget-like shape may be filled, or a plate material/heat resisting steel plate or the like having many holes formed thereto such as punching metal may be accommodated in the form of a single layer or a multi-layer.

The regenerative medium 2 used in the regenerative burner 1 of this embodiment is formed of ceramics having the honey-comb shape (the number of cells: 10 to 200 cells/$in^2$), and usually 4 to 10 small blocks (50 mm□ to 200 mm□×50 mmh) are superposed in the vertical direction and used. The exhaust gas and the air alternately flow in the honeycomb-shaped path in the opposed directions every short time, e.g., approximately 30 seconds. The exhaust gas and the air reciprocate such that there is no local turbulent flow area or low flow velocity in the flow in the honeycomb. Therefore, even if soot and the like is generated, adhesion or deposition of such soot is rare. Thus, the regenerator does not have to be cleaned or replaced even if it is used for a long time, and the fact that the maintenance is not required is also characteristic.

The burner having the above-described structure is operated as follows, for example.

At first, during the temperature-up period in which the furnace temperature is increased from an ordinary temperature to a determined temperature (temperature at which high-temperature combustion can be effected, for example, not less than 800° C.), the fuel is injected from the first fuel nozzle 12 for the start-up and if necessary, the second fuel nozzle 11 for the rated operation, and the burner is operated. After reaching a predetermined temperature, switching is carried out so that the fuel is injected from only the second fuel nozzle 11 for the rated operation and the fuel injection from the first fuel nozzle 12 is stopped. Of course, the fuel may be injected from both of the first and second fuel nozzles 11 and 12 in some cases. Then, the flapper-type three-way valve 3 is operated to perform the alternate combustion operation.

In alternate combustion, for example, two adjacent burners form a pair (a burner A and a burner B), and one of the burners enters the combustion mode while the other burner enters the exhaust mode (the combustion gas in the furnace is sucked and emitted to the outside of the furnace). Exhaust is carried out after the exhaust gas is transmitted from the air throat 13 of the burner body 10 through the regenerative medium 2 and sensible heat of the exhaust gas is collected by the regenerative medium 2 to obtain a low temperature. Subsequently, during combustion, by passing the combustion air to the regenerative medium 2, preheated air having a high temperature close to a furnace combustion gas temperature can be obtained. The second fuel nozzle 11 supplies the fuel with the timing which is substantially the same as that of supply of combustion air. Usually, the pilot burner is not incorporated to the second fuel nozzle 11 which injects the fuel directly into the furnace during the rated operation, and primary air is not used. However, when flowing air to the first fuel nozzle 12 or the like for cooling, a quantity of supply air and a quantity of fuel are adjusted so that the air ratio less than the theoretical air ratio can be obtained as a whole including this cooling air. In addition, respective gas solenoid valves of a pair of the burners are opened and closed in synchronization with the flapper-type three-way valve 3.

Here, when flows of the exhaust gas and the combustion air to the regenerative medium are relatively switched and exhaust of the combustion exhaust gas and the supply of the combustion air are alternately carried out through the regenerative medium, the combustion air is preheated to a high temperature close to a temperature of the exhaust gas, then supplied and subjected to combustion. In the rated operation, the combustion air is injected at a flow velocity at the time of usual combustion or a higher flow velocity, and the fuel is injected toward this air jet flow. Additionally, the combustion air and the fuel are caused to speedily collide with each other at a position away from the outlet of the air jet flow by a specific distance, and they are rapidly mixed. Here, the rated operation means the operation satisfying design prerequisites for, e.g., combustion in the state where the furnace temperature has reached a value which is not less than, for example, 800° C.

At this moment, the fuel injected from the second fuel nozzle 11 at a high speed and the combustion air injected from the air throat 13 at a high speed collide with each other at a position away from the outlet 13a of the air throat 13 by a given distance La while keeping the law of similarity between them, and they are rapidly mixed by turbulent diffusion. Therefore, when a quantity of supply air is less than the theoretical air quantity, rapid initial mixing occurs and non-oxidizing reduction combustion is provoked. Further, when a quantity of supply air is not less than the theoretical air quantity, diffusion combustion occurs. Here, when the combustion air injected into the furnace through the regenerative medium 2 at a high speed is preheated to a high temperature close to an exhaust gas temperature and injected into the furnace, it has already reached a temperature equal to or above a self-ignition temperature of mixed gas. Therefore, the combustion air having the oxygen density rapidly decreased by contact with the surrounding combustion gas in a wide area immediately after injection into the furnace is rapidly mixed with the fuel before losing the velocity energy which is necessary and sufficient for turbulent diffusion mixing involving strong turbulences and, at the same time, combustion is started. Furthermore, even if the combustion air and the fuel are rapidly mixed before losing the velocity energy which is necessary and sufficient for turbulent diffusion involving strong turbulences, a combustion area spreads wider than that in case of turbulent diffusion mixing and a locally high temperature area is not generated because the oxygen density of the combustion air is satisfactorily low. Furthermore, the combustion air preheated to a high temperature becomes a high-speed flow to activate behavior/circulation of the combustion gas in the furnace and forms a combustion field having a flat temperature distribution without a locally high temperature area. That is, in case of non-oxidizing reduction combustion, an amount of free $O_2$ can be reduced as much as possible, generation of unburned soot is minimized. Also, generation of NOx can be suppressed. Moreover, in case of diffusion combustion with the air ratio of not less than 1, since a locally high temperature area is not generated even though combustion is effected at a high speed, the flame length can be shortened while suppressing generation of NOx.

In addition, the combustion mode and the exhaust mode of a pair of the regenerative burners 1 are switched in accordance with each predetermined switching time, e.g., every approximately 30 seconds. As to changeover of the burner performing combustion, it is preferable to minimize fluctuations in the pressure in the furnace by staggering the timing between each pair and sequentially performing combustion. At any rate, a period which can be called a quiescent time is not provided between combustion of the burner A and combustion of the burner B. With the switching operation fuel valve, the burner A is closed nearly simultaneously with opening of the burner B. That is, in this embodiment in which the burner body 10 is directly connected with the flapper type three-way valve 3, only a very short purge time (for example, the purge time equal to or less than 0.3 second required for quenching and ignition of the other burner) can be taken for the switching time, and the switching time is set in such a manner that one of the burners is quenched and at the same time the other burner is ignited. As a result, fluctuations in the furnace pressure can be suppressed to approximately ¼, and the actual working efficiency of the burner can be increased. Moreover, in non-oxidizing reduction combustion, an amount of free $O_2$ can be minimized.

Here, although switching of the three-way valve 3 can be performed based on a predetermined switching time, the three-way valve 3 may be switched based on an exhaust gas temperature measured by the thermocouple. It is preferable for the exhaust temperature to be controlled between a temperature close to an ordinary temperature and, e.g., 200° C. to 300° C.

It is to be noted that alternate combustion is not restricted to the case where burners forming a pair are fixed as mentioned above and a burner on the opposite side with which a pair is sequentially formed may be changed for alternate combustion. For example, although not shown, assuming that the burner shown in FIG. 1 is determined as a unit, a combustion system may be constituted by three or more units, and a ratio of the number of burners used for combustion and the number of burners used for exhaust by stopping combustion may be variable. In addition, the number of the burners used for exhaust may be set larger than the number of the burners used for combustion so that all the units do not form fixed pairs and they sequentially repeat alternate combustion. In this case, since all the burners of the units perform combustion by staggering the timings and reducing the purge time for switching as much as possible, alternate combustion can be attained while forming non-stationary flames in a wide area. Therefore, realization of the non-stationary flames is advanced as compared with the alternate combustion burner system according to the embodiment shown in FIG. 1, and the furnace temperature distribution can be further uniformized. Furthermore, the velocity of the combustion air injected from the air throat can be maintained high by reducing the number of combustion burners even if a quantity of combustion is decreased. Initial mixing can be maintained in the excellent state, and flowage of the furnace gas can be kept active. It is possible to form the flat furnace temperature distribution by which suppression of soot, free $O_2$ and NOx can be achieved while generation of local high temperature areas can be suppressed. Here, even if the number of the combustion burners is different from that of the exhaust burners, the relationship between a quantity of supply air and a quantity of exhaust does not change. That is, even if the ratio of the number of the combustion burners and that of the exhaust burners is 1:1 or 1:2, a quantity of air flow and a quantity of exhaust are not different from each other in terms of one stroke. However, if the ratio of the combustion burner is lowered, the ratio of air time is thereby reduced for that. The velocity of the fluid flowing in the regenerator is high when the fluid is air and it is low when the fluid is exhaust gas. Thus, heat transmission is better in case of cooling, and the efficiency of the regenerator tends to be improved. That is, there is a tendency that a temperature of the heating air is increased and a temperature of exhaust is lowered.

Figure 6:
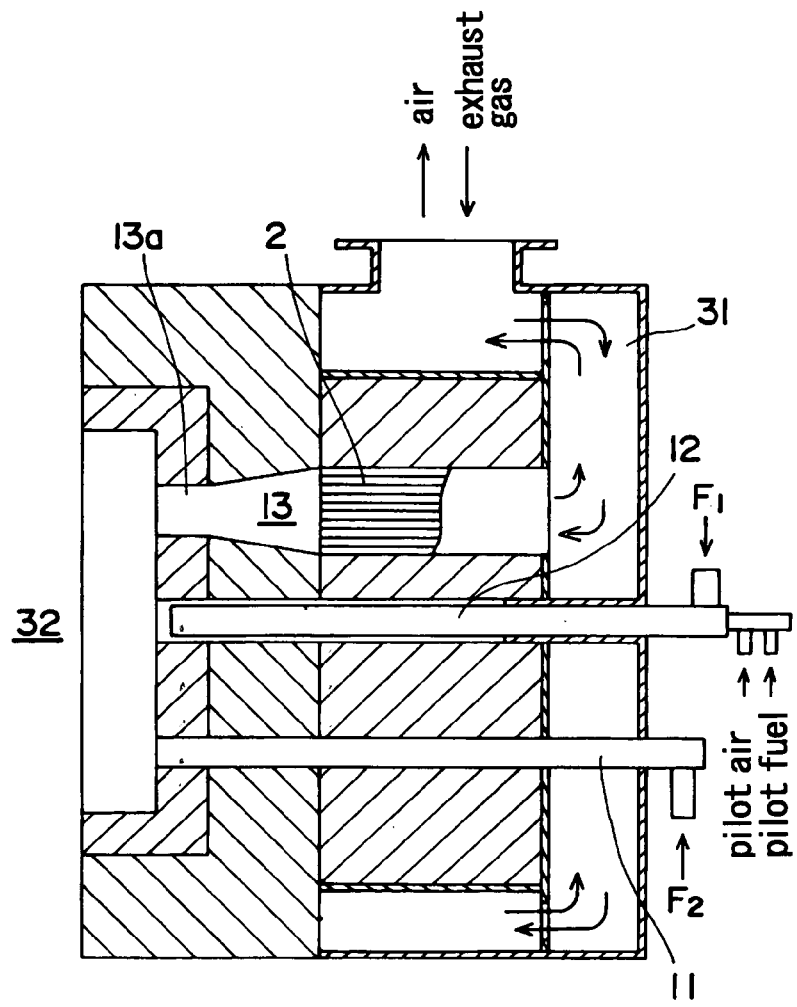
FIG. 6 is a vertical cross-sectional view showing from the center another embodiment of a non-oxidizing burner for carrying out the non-oxidizing reduction combustion method according to the present invention.
Figure 7A:
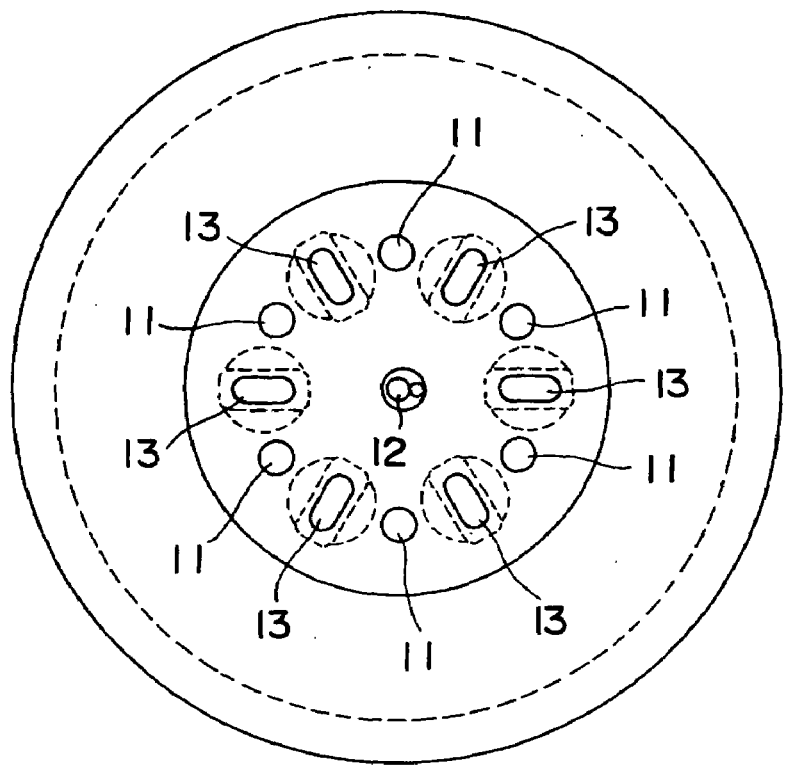
FIG. 7A is a front view and FIG. 7B is a cross-sectional view.
Figure 7B:
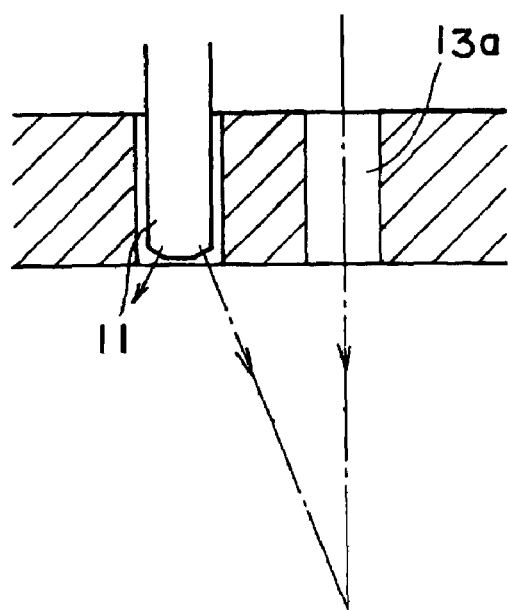
Figure 8:
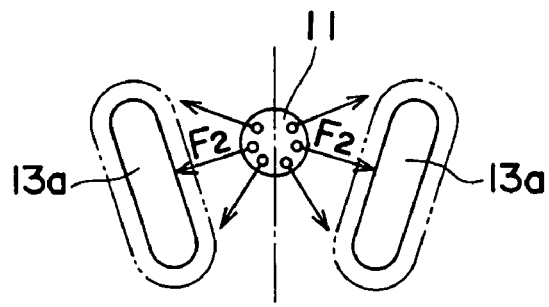
FIG. 8 is an explanatory drawing showing a collision relationship between a combustion air jet flow and a fuel jet flow of the burner illustrated in FIG. 6.
Figure 9:
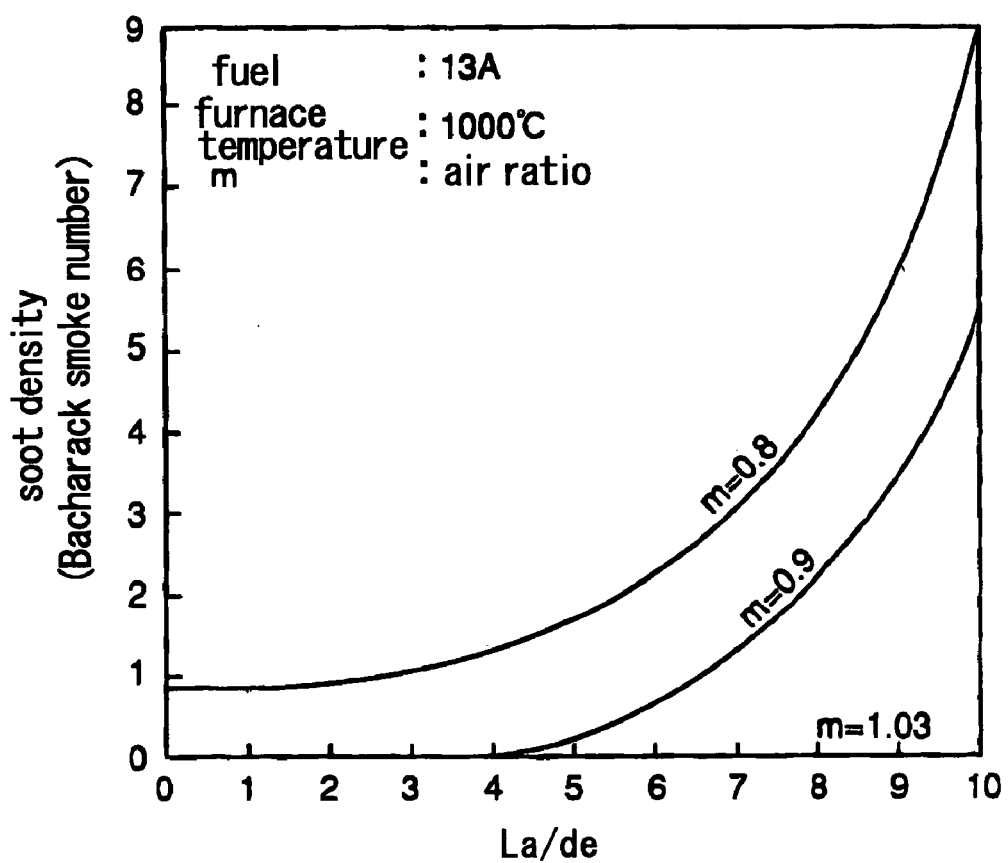
FIG. 9 is a graph showing a result of experimenting a relationship between soot density and a ratio La/de in accordance with each air ratio.
Figure 10:
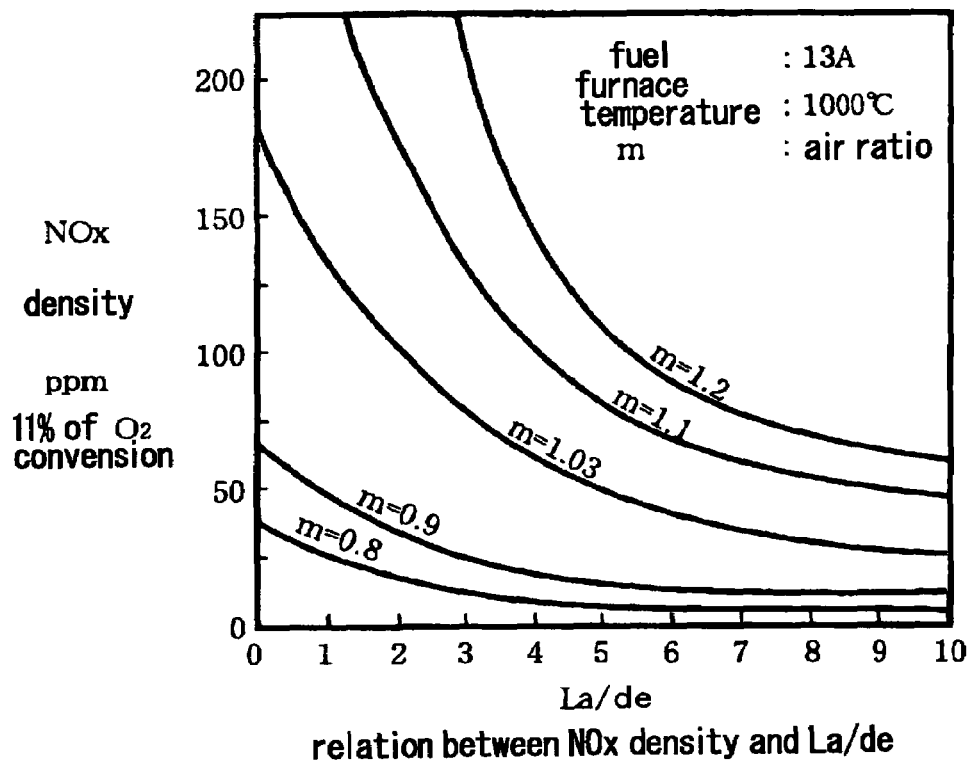
FIG. 10 is a graph showing a result of experimenting a relationship between a quantity of generated NOx and the ratio La/de in accordance with each air ratio.

FIGS. 6 to 8 show another embodiment. This embodiment is a typical example in which this structural condition is applied to a large apparatus (for example, a high-temperature hot blast generation facility or a reducing furnace). To this burner are alternately arranged the air throats 13 and the second fuel nozzles 11 in the annular form, and one large combustion machine is constituted as a whole. In this embodiment, one large combustion machine is configured by alternately arranging rectangular (flat and small) air throats 13 provided at six positions and six second fuel nozzles 11 in the annular form in contiguity with each other. It is to be noted that reference numeral 12 in the drawings denotes a first fuel nozzle having a start-up pilot burner; 31, a wind box; and 32, the inside of the furnace.

In this burner apparatus, when performing non-oxidizing reduction combustion, the second fuel nozzle 11 is likewise set so that a ratio de/Dpcd of a corresponding diameter de of the air throat 13 and a gap Dpcd between two fuel nozzles sandwiching the air throat 13 falls within a range of 0.1 to 0.5 and a ratio La/de of the corresponding diameter de of the air throat relative to a distance La from an intersection of a fuel jet flow axis and a plane on the central axis in the air throat longitudinal direction to an outlet surface of the air throat falls within a range of 1.0 to 5.0. Furthermore, when performing diffusion combustion with the air ratio of not less than 1, the second fuel nozzle 11 is set so that de/Dpcd falls within a range of 0.1 to 0.5 and the ratio La/de of the corresponding diameter de of the air throat relative to the distance La from the intersection of the fuel jet flow axis and the plane on the central axis in the air throat longitudinal direction to an outlet surface of the air throat falls within a range of 2.0 to 10.0.

Moreover, the combustion air is led into the wind box 31 and injected into the furnace from the outlet 13a of each air throat 13 through each regenerative medium 2 at a flow velocity at the time of usual combustion or a higher flow velocity. The fuel injected from the surrounding second fuel nozzles 11 is caused to collide with the combustion air at a high speed at a position away from the outlets of the air throats 13 by a given short distance, e.g., a position satisfying the above-described respective ranges, and the fuel and the combustion air are rapidly mixed.

Figure 12A:
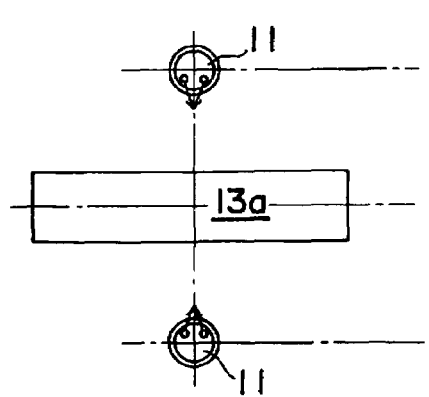
FIG. 12A is a front view and FIG. 12B is a vertical cross-sectional view.
Figure 12B:
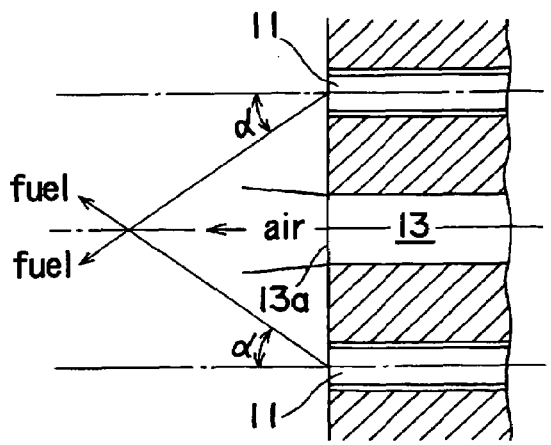

FIGS. 12 to 14 show still another embodiment. In this embodiment, a plurality of fuel injection openings (small holes) are provided to the fuel nozzle or a plurality of fuel nozzles are arranged in such a manner that injected fuel jet flows are caused to collide with each other before coming in contact with the air jet flow. In this case, since a jet flow which flatly spreads can be obtained when the fuel jet flows collide with each other before coming in contact with the air jet flow, a contact surface area relative to the air jet flow is increased. As a result, the ignition source is stabilized in a wide range from a low temperature to a high temperature of the combustion air. At the same time, initial mixing is rapidly carried out, and the combustion reaction is thereby accelerated. In case of non-oxidizing reduction combustion with the air ratio of less than 1, an amount of free $O_2$ can be reduced as much as possible, and minimization of generation of soot is realized. In case of diffusion combustion with the air ratio of not less than 1, the flame length can be shortened without increasing NOx.

For example, as shown in FIGS. 13A and 13B, the fuel nozzle is formed in such a manner that at least two injection openings are opened at equal distances from the air throat opening 13a and the fuel jet flows collide with each other before coming in contact with the air jet flow. At least one or preferably two or more such fuel nozzles 11 are arranged around the air throat 13 having, e.g., a rectangular opening 13a. In the embodiment shown in FIG. 13, although two fuel nozzles 11 are oppositely arranged so as to sandwich the air throat 13, four or more fuel nozzles may be oppositely arranged as shown in FIG. 13. Moreover, at least two injection openings of the fuel nozzle can be opened at different distances from the air throat opening 13a as shown in, e.g., FIG. 14 so that the fuel jet flows collide with each other and then further collide with the air jet flow. In this case, the fuel jet flows spread like a film in parallel with the air jet flow when the fuel jet flows collide with each other, and thereafter they collide with the air jet flow. Thus, the contact surface area relative to the air jet flow is further increased. Accordingly, the ignition source can be stabilized in a wide range from a low temperature to a high temperature of the combustion air and, at the same time, the combustion reaction is facilitated.

Figure 15A:
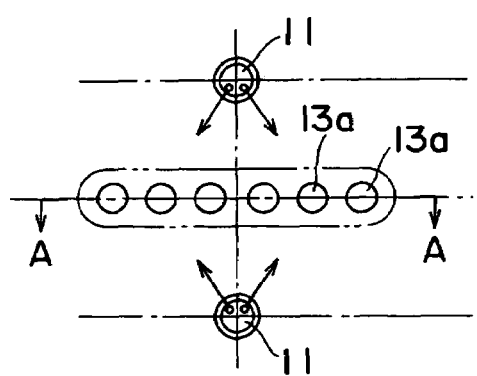
FIG. 15A is a front view.
Figure 15B:
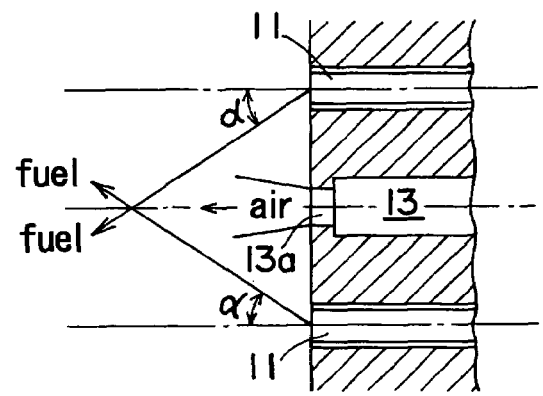
FIG. 15B is a vertical cross-sectional view and FIG. 15C is a cross-sectional view taken along a line A—A.
Figure 15C:
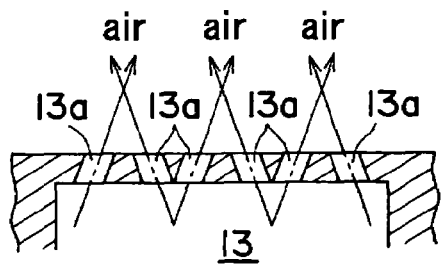
Figure 16A:
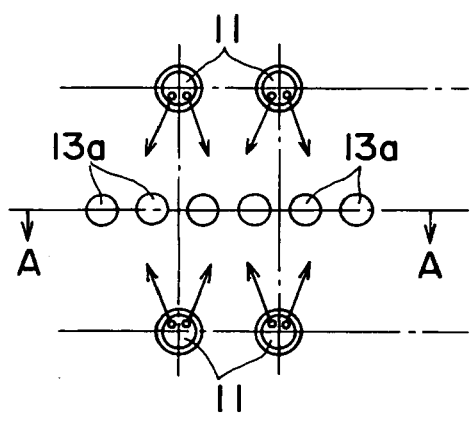
FIG. 16A is a front view.
Figure 16B:
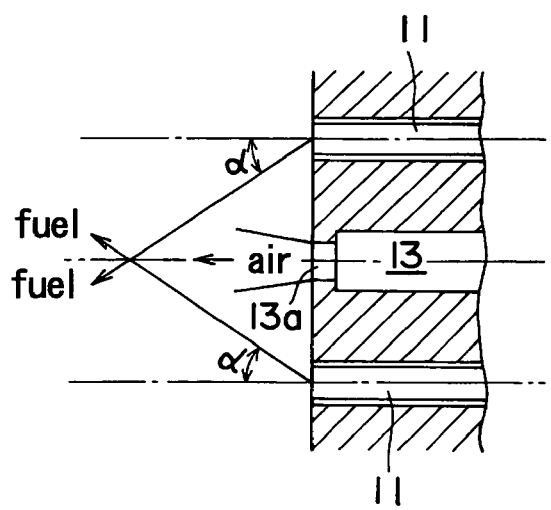
FIG. 16B is a vertical cross-sectional view and FIG. 16C is a cross-sectional view taken along a line A—A.
Figure 16C:
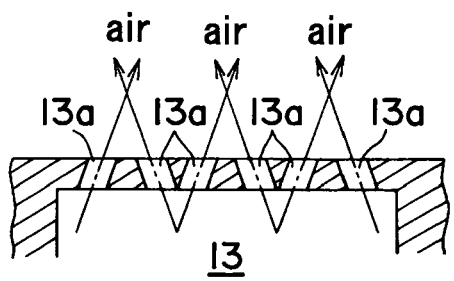
Figure 17:
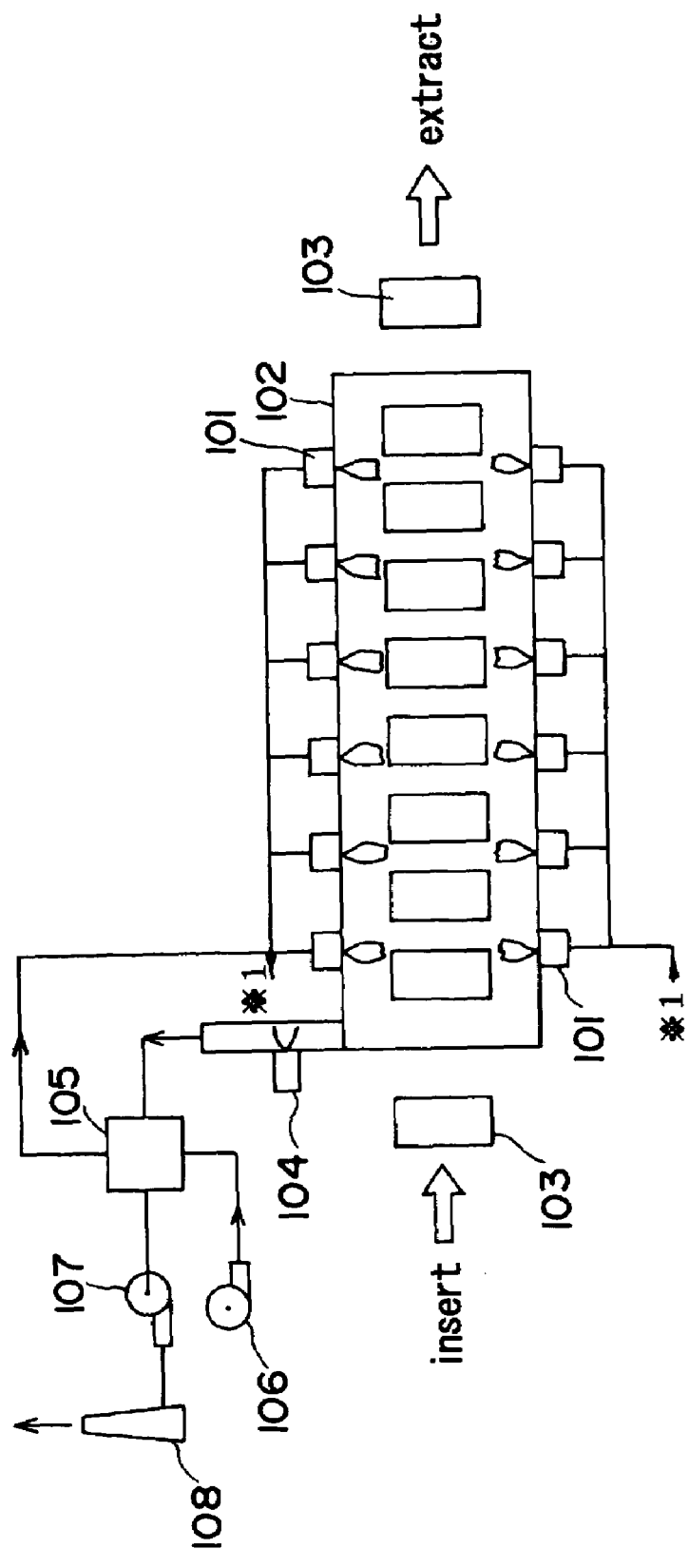
FIG. 17 is a schematic principle view showing an example of a non-oxidizing combustion furnace for carrying out a conventional non-oxidizing combustion method.
Figure 18A:
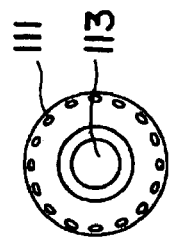
FIG. 18A is a vertical cross-sectional view and FIG. 18B is a front view showing an arrangement relationship between the fuel nozzle and the air nozzle.
Figure 18B:
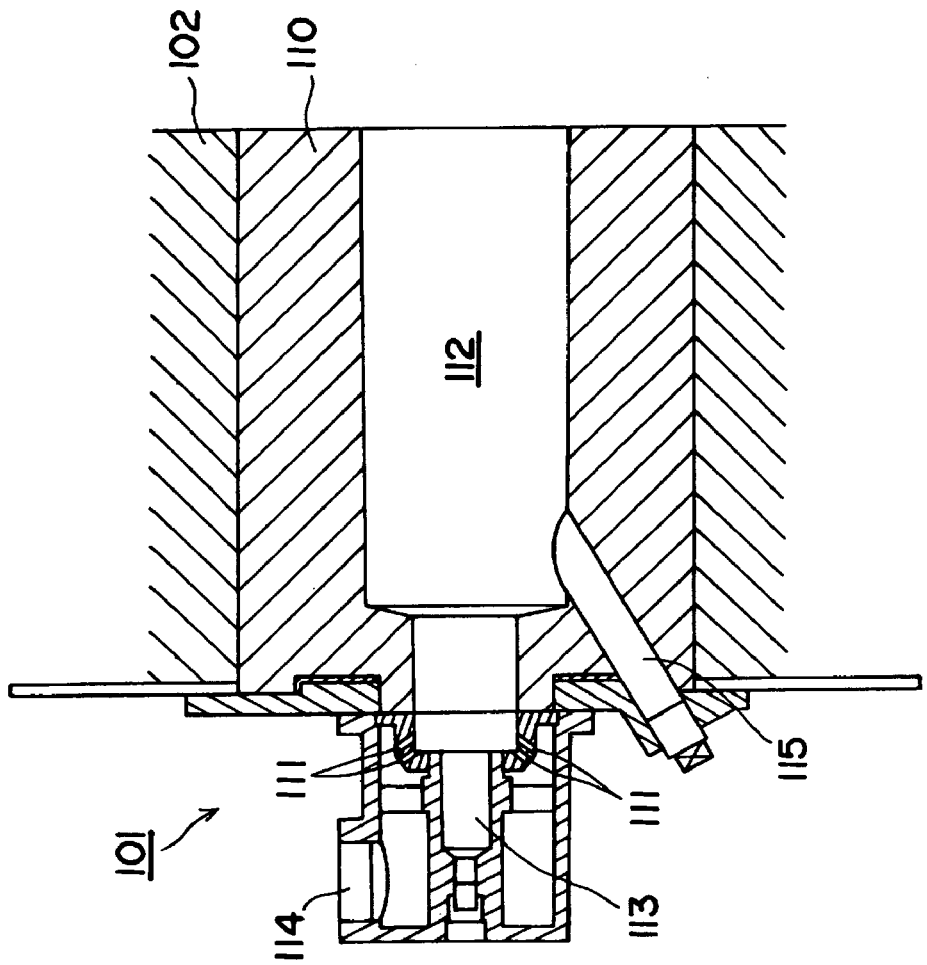

FIGS. 15 and 16 show yet another embodiment. In this embodiment, a plurality of air jet flows are formed, and the air jet flows are caused to collide with each other before coming in contact with the fuel jet flows. In this case, by forming a jet flow in which the air jet flows collide with each other and the same in which the fuel jet flows collide with each other before the air jet flows collide with the fuel jet flows, a plurality of planate jet flows of the fuel and the combustion air which flatly spread can be obtained. Therefore, a contact surface area relative to the furnace high-temperature gas is greatly increased as compared with the case of a single planate fuel jet flow and a single planate combustion air jet flow. As a result, the fuel and the combustion air are diluted/preheated (condition of the furnace temperature of not less than 800° C.) at a very short distance from each of the fuel injection portion and the combustion air injection portion. At this moment, the fuel has a high temperature, also the calorific power is sufficiently reduced. Also, the combustion air has a high temperature, and the oxygen density is satisfactorily low. Thus, even if the fuel and the combustion air are mixed in this state, the ignition source can be stabilized in a wide range of the supply air temperature, and combustion is formed without generating locally high temperature areas. At the same time, the combustion reaction is greatly facilitated. In case of non-oxidizing reduction combustion with the air ratio of less than 1, an amount of free $O_2$ can be reduced as much as possible, and minimization of generation of soot can be realized. In case of diffusion combustion with the air ratio of not less than 1, the flame length can be shortened without increasing NOx.

For example, as shown in FIGS. 15A to 15C, the air throat 13 is provided so as to form a flat rectangular air jet flow which is substantially similar to that injected from a rectangular throat opening by dividing the injection opening 13a into six small circular holes and arranging these small holes in contiguity with each other so that respective jet flows become continuous, not become independent. Further, the respective circular holes 13a are formed so as to be inclined and every other hole 13a faces the opposite direction. Also, these hole are formed in such a manner that the adjacent air jet flows collide with each other and then collide with the fuel jet flows. Here, the fuel jet flow may be formed so that it is divided at positions away from the air jet flows and the divided flows then collide with the air jet flows as shown in the drawings. Alternatively, these holes may be formed in such a manner that the fuel jet flows collide with each other and then collide with the air jet flows and collision of the air jet flows and that of the fuel jet flows are carried out before the fuel jet flows collide with the air jet flows as shown in FIGS. 12 to 14. Moreover, the number of the fuel nozzles 11 is not restricted to the specific number. The fuel diffusion effect becomes prominent as the number of the fuel nozzles 11 is increased as shown in FIG. 16, and the ignition source can be stabilized concurrently with facilitation of the combustion reaction. In case of non-oxidizing reduction combustion with the air ratio of less than 1, an amount of free $O_2$ can be reduced as much as possible, and minimization of generation of soot can be realized. In case of diffusion combustion with the air ratio of not less than 1, the flame length can be shortened without increasing NOx.

Incidentally, although the above has described the preferred embodiments according to the present invention, the present invention is not restricted thereto, and various modifications are possible without departing from the scope of the invention. For example, the combustion method for alternately performing combustion of a pair of burners has been mainly explained in this embodiment, the present invention is not restricted thereto, and it is possible to adopt the regenerative burner structure which continuously perform combustion of the same burner. That is, the independent air throat 13 and exhaust path are separately provided, and the furnace gas is continuously exhausted from the exhaust path. On the other hand, the combustion air preheated to a high temperature can be continuously supplied from the air throat and then continuously burned. In this case, since the exhaust gas and the combustion air must be continuously passed to the regenerative medium without being intermittent, for example, the regenerative medium is arranged outside the air throat 13 and rotated or the exhaust gas flow path and the air flow path are rotated or switched with respect to the regenerative medium so that the combustion exhaust gas and the combustion air can be simultaneously passed to the regenerative medium through which they relatively move at different areas/positions. As a result, the air is caused to flow to a heated part of the regenerative medium and the air is preheated to a high temperature.

Moreover, although the foregoing embodiment has been described by mainly taking the regenerative burner having the regenerative medium provided inside the burner body 10 as an instance, the present invention is not restricted thereto, and the regenerative medium may be set outside the burner body. Alternatively, it is possible to adopt a non-regenerative burner which supplies the combustion air and exhausts the combustion gas without using the regenerative medium. In the case of the non-regenerative burner, when the fuel and the combustion air are injected into the furnace having a furnace temperature of not less than 800°, they are mixed with the furnace gas and diluted and preheated to increase an air temperature before the fuel jet flows and the air jet flows collide with each other. Thus, even if the supply air temperature is, for example, 200° C. to 300° C., the air readily reaches a temperature required for the high-temperature air combustion, i.e., 800°, before coming in contact with the fuel jet flows.

Moreover, the foregoing embodiment has mainly described the case where the flapper type three-way valve 3 is used as the flow path switching means, the present invention is not restricted to this three-way valve. Any three-way valve having other structures, combination of a plurality of solenoid valves or a four-way valve can be used. In addition, the fuel is not restricted to the gas fuel, and oil fuel or both of oil fuel and gas fuel can be used.

What is claimed is:

1. A combustion method comprising steps of:
   forming combustion air so as to have a jet flow cross section in an air throat, having a larger specific surface area than that in a case of supplying from a circular throat the same quantity of combustion air as said combustion air has;
   injecting said combustion air into a furnace;
   injecting fuel toward a jet flow of said air for causing a jet flow of said fuel to be rapidly mixed with said air jet flow with strong turbulence before losing velocity energy of said fuel jet flow;
   wherein said combustion air is supplied after being preheated to have a high temperature close to a temperature of combustion exhaust gas by collecting heat of said combustion exhaust gas exhausted from a regenerative medium; and
   wherein said combustion air whose quantity is less than a theoretical air quantity is supplied and high-temperature air combustion for forming a non-oxidizing atmosphere or a reduction atmosphere is carried out; and said fuel is injected with a ratio de/Dpcd of a corresponding diameter de of an opening (13a) of said air throat (13) and a gap ½ Dpcd from a center of said air throat to a center of said fuel nozzle (11) falling within a range of 0.1 to 0.5 and with a ratio La/de of said corresponding diameter de of said air throat relative to a distance La from an intersection of a fuel injection axis and a plane on a central axis in a longitudinal direction of said air throat to an outlet surface of said air throat falling within a range of 1.0 to 5.0.

2. A combustion method according to claim 1, wherein said combustion air is formed into a jet flow which is flat and has a thin radial thickness as a whole.

3. A combustion method according to claim 1, wherein said fuel is injected from at least two separate injection openings, caused to collide with an air jet flow having an increased specific surface area in a wide area, and rapidly mixed with said air jet flow with strong turbulences.

4. A combustion method according to claim 1, wherein a plurality of said fuel jet flows are formed, and said fuel jet flows collide with each other in the furnace before coming in contact with said air jet flow.

5. A combustion method according to claim 1, wherein a plurality of said air jet flows are formed, and said air jet flows collide with each other in the furnace before coming in contact with said fuel jet flow.

6. A combustion method according to claim 1, wherein a plurality of said fuel jet flows and said air jet flows are formed, and said air jet flows collide with each other and said fuel jet flows collide with each other in the furnace before said fuel jet flows collide with said air jet flows.

7. A combustion method according to claim 1, wherein a plurality of pairs of said fuel jet flows and said air jet flows which collide with each other in said furnace are formed in order to form a large combustion field.

8. A burner comprising:
   an air throat (13) for forming a combustion air so as to have a jet flow cross section having a larger specific surface area than that in a case of supplying from a circular throat the same quantity of combustion air as said combustion air has and for injecting a full quantity of said combustion air into a furnace; and
   a fuel nozzle (11) for injecting fuel into said furnace so as to cause a jet flow of said fuel to collide with said air jet flow at a position away from an injection opening (13a) of said air throat by a specific distance before losing velocity energy of said fuel jet flow;
   wherein said combustion air supplied from said air throat has a quantity which is less than a theoretical air quantity, and high-temperature air combustion for forming a non-oxidizing atmosphere or a reduction atmosphere is carried out; and said fuel being injected with a ratio de/Dpcd of a corresponding diameter de of said injection opening of said air throat and a gap ½ Dpcd from a center of said air throat to a center of said fuel nozzle falling within a range of 0.1 to 0.5 and with a ratio La/de of said corresponding diameter de of said air throat relative to a distance La from an intersection of a fuel injection axis and a plane on a central axis in a longitudinal direction of said air throat to an outlet surface of said air throat falling within a range of 1.0 to 5.0; and wherein said air throat includes a regenerative medium (2) and flow switching means (3) for alternately leading combustion exhaust gas and combustion air to said regenerative medium, and injects into said furnace said combustion air preheated to have a high temperature close to a combustion exhaust gas temperature through said regenerative medium.

9. A burner according to claim 8, wherein said air throat has a flat rectangular opening.

10. A burner according to claim 8, wherein said specific surface area can be increased by dividing said air throat into a plurality of small holes.

11. A burner according to claim 8, wherein said air throat is divided into a plurality of small holes, and respective jet flows are continuously arranged in a form of a line without being independent to form a jet flow having a flat cross-sectional shape as a whole.

12. A burner according to claim 10, wherein a plurality of said small holes form a jet flow in which said air jet flows collide with each other before coming in contact with said fuel jet flow.

13. A burner according to claim 8, wherein said fuel nozzle has at least two injection openings and causes said fuel to collide with said air jet flow having an increased specific surface area in a wide area.

14. A burner according to claim 8, wherein said fuel nozzle has at least two injection openings and forms a jet flow in which fuel jet flows injected from said respective injection openings collide with each other before coming in contact with said air jet flow.

15. A burner according to claim 8, wherein a plurality of said fuel nozzles are arranged so as to surround said air jet flow.

16. A burner according to claim 15, wherein a plurality of said fuel nozzles form a jet flow in which said fuel jet flows collide with each other before coming in contact with said air jet flow.

17. A burner according to claim 8, wherein a plurality of said air jet flows and a plurality of said fuel jet flows are formed, and said air jet flows collide with each other and said fuel jet flows collide with each other before said air jet flows collide with said fuel jet flows.

18. A burner according to claim 8, wherein a ceramic honeycomb is included as said regenerative medium.

19. A burner according to claim 8, wherein said regenerative medium is included in said air throat, and said flow switching means is directly connected to a burner body constituting said air throat and switches said combustion air and said exhaust gas at a short distance from said regenerative medium.

20. A burner according to claim 8, a plurality of pairs of said air throats and said fuel nozzles are set to constitute a large combustion machine.

21. A burner comprising;
an air throat (13) for forming a combustion air so as to have a jet flow cross section having a larger specific surface area than that in a case of supplying from a circular throat the same quantity of combustion air as said combustion air has and for injecting a full quantity of said combustion air into a furnace; and a fuel nozzle (11) for injecting fuel into said furnace so as to cause a jet flow of said fuel to collide with said air jet flow at a position away from an injection opening (13a) of said air throat by a specific distance before losing velocity energy of said fuel jet flow;

wherein said combustion air supplied from said air throat has a quantity which is not less than a theoretical air quantity, and high-temperature air combustion by turbulent diffusion mixing is provoked; and said fuel being injected with a ratio de/Dpcd of a corresponding diameter de of said injection opening of said air throat and a gap ½ Dpcd from a center of said air throat to a center of said fuel nozzle falling within a range of 0.1 to 0.5 and with a ratio La/de of said corresponding diameter de of said air throat relative to a distance La from an intersection of a fuel jet flow axis and a plane on a central axis in a longitudinal direction of said air throat to an outlet surface of said air throat falling within a range of 2.0 to 10.0; and wherein said air throat includes a regenerative medium (2) and flow switching means (3) for alternately leading combustion exhaust gas and combustion air to said regenerative medium, and injects into said furnace said combustion air preheated to have a high temperature close to a combustion exhaust gas temperature through said regenerative medium.

22. A burner according to claim 21, wherein said air throat has a flat rectangular opening.

23. A burner according to claim 21, wherein said specific surface area can be increased by dividing said air throat into a plurality of small holes.

24. A burner according to claim 21, wherein said air throat is divided into a plurality of small holes, and respective jet flows are continuously arranged in a form of a line without being independent to form a jet flow having a flat cross-sectional shape as a whole.

25. A burner according to claim 23, wherein a plurality of said small holes form a jet flow in which said air jet flows collide with each other before coming in contact with said fuel jet flow.

26. A burner according to claim 21, wherein said fuel nozzle has at least two injection openings and causes said fuel to collide with said air jet flow having an increased specific surface area in a wide area.

27. A burner according to claim 21, wherein said fuel nozzle has at least two injection openings and forms a jet flow in which fuel jet flows injected from said respective injection openings collide with each other before coming in contact with said air jet flow.

28. A burner according to claim 21, wherein a plurality of said fuel nozzles are arranged so as to surround said air jet flow.

29. A burner according to claim 28, wherein a plurality of said fuel nozzles form a jet flow in which said fuel jet flows collide with each other before coming in contact with said air jet flow.

30. A burner according to claim 21, wherein a plurality of said air jet flows and a plurality of said fuel jet flows are formed, and said air jet flows collide with each other and said fuel jet flows collide with each other before said air jet flows collide with said fuel jet flows.

31. A burner according to claim 21, wherein a ceramic honeycomb is included as said regenerative medium.

32. A burner according to claim 21, wherein said regenerative medium is included in said air throat, and said flow switching means is directly connected to a burner body constituting said air throat and switches said combustion air and said exhaust gas at a short distance from said regenerative medium.

33. A burner according to claim 21, a plurality of pairs of said air throats and said fuel nozzles are set to constitute a large combustion machine.

34. A combustion method comprising steps of:
forming combustion air so as to have a jet flow cross section in an air throat, having a larger specific surface area than that in a case of supplying from a circular throat the same quantity of combustion air as said combustion air has;
injecting said combustion air into a furnace;
injecting fuel toward a jet flow of said air for causing a jet flow of said fuel to be rapidly mixed with said air jet flow with strong turbulence before losing velocity energy of ais fuel jet flow;
wherein said combustion air is supplied after being preheated to have a high temperature close to a temperature of combustion exhaust gas by collecting heat of said combustion exhaust gas exhausted from a regenerative medium; and
wherein said combustion air whose quantity is not less than a theoretical air quantity is supplied and high-temperature air combustion by turbulent diffusion mixing is provoked; and said fuel is injected with a ratio de/Dpcd of a corresponding diameter de of an opening (13a) of said air throat (13) and a gap ½ Dpcd from a center of said air throat to a center of said fuel nozzle (11) falling within a range of 0.1 to 0.5 and with a ratio La/de of said corresponding diameter de of said air throat relative to a distance La from an intersection of a fuel jet flow axis and a plane on a central axis in a longitudinal direction of said air throat to an outlet surface of said air throat falling within a range of 2.0 to 10.0.

35. A combustion method according to claim 34, wherein said combustion air is formed into a jet flow which is flat and has a thin radial thickness as a whole.

36. A combustion method according to claim 34, wherein said fuel is injected from at least two separate injection openings, caused to collide with an air jet flow having an increased specific surface area in a wide area, and rapidly mixed with said air jet flow with strong turbulences.

37. A combustion method according to claim 34, wherein a plurality of said fuel jet flows are formed, and said fuel jet flows collide with each other in the furnace before coming in contact with said air jet flow.

38. A combustion method according to claim 34, wherein a plurality of said air jet flows are formed, and said air jet flows collide with each other in the furnace before coming in contact with said fuel jet flow.

39. A combustion method according to claim 34, wherein a plurality of said fuel jet flows and said air jet flows are formed, and said air jet flows collide with each other and said fuel jet flows collide with each other in the furnace before said fuel jet flows collide with said air jet flows.

40. A combustion method according to claim 34, wherein a plurality of pairs of said fuel jet flows and said air jet flows which collide with each other in said furnace are formed in order to form a large combustion field.

* * * * *

UNITED STATES PATENT AND TRADEMARK OFFICE
CERTIFICATE OF CORRECTION

PATENT NO. : 6,926,516 B1
DATED : August 9, 2005
INVENTOR(S) : Jun Sudo et al.

It is certified that error appears in the above-identified patent and that said Letters Patent is hereby corrected as shown below:

<u>Title page,</u>
Item [73], Assignee, should read -- Nippon Furnace Kogyo Kabushiki Kaisha, Kanagawa (JP) --.

Signed and Sealed this

Twenty-seventh Day of September, 2005

JON W. DUDAS
*Director of the United States Patent and Trademark Office*